(12) United States Patent
Kumar et al.

(10) Patent No.: US 9,083,062 B2
(45) Date of Patent: Jul. 14, 2015

(54) BATTERY PACKS FOR VEHICLES AND HIGH CAPACITY POUCH SECONDARY BATTERIES FOR INCORPORATION INTO COMPACT BATTERY PACKS

(75) Inventors: Sujeet Kumar, Newark, CA (US); James P. Buckley, San Jose, CA (US)

(73) Assignee: Envia Systems, Inc., Newark, CA (US)

(*) Notice: Subject to any disclaimer, the term of this patent is extended or adjusted under 35 U.S.C. 154(b) by 870 days.

(21) Appl. No.: 13/195,672

(22) Filed: Aug. 1, 2011

(65) Prior Publication Data
US 2012/0028105 A1    Feb. 2, 2012

Related U.S. Application Data

(60) Provisional application No. 61/369,825, filed on Aug. 2, 2010.

(51) Int. Cl.
*H01M 6/42* (2006.01)
*H01M 4/13* (2010.01)
(Continued)

(52) U.S. Cl.
CPC .......... *H01M 10/4207* (2013.01); *H01M 4/131* (2013.01); *H01M 4/133* (2013.01); *H01M 4/366* (2013.01); *H01M 10/0525* (2013.01); *H01M 10/482* (2013.01); *H01M 2/0207* (2013.01); *H01M 2220/20* (2013.01); *Y02E 60/122* (2013.01); *Y02T 10/7011* (2013.01)

(58) Field of Classification Search
CPC .......... H01M 6/42; H01M 4/13; H01M 4/50; H01M 4/58; H01M 10/625
USPC ...................... 429/149, 231.95, 223, 224, 157
See application file for complete search history.

(56) References Cited

U.S. PATENT DOCUMENTS

| | | | |
|---|---|---|---|
| 5,514,488 A | 5/1996 | Hake et al. | |
| 6,080,507 A | 6/2000 | Yu | |

(Continued)

FOREIGN PATENT DOCUMENTS

| | | |
|---|---|---|
| JP | 07-065825 | 3/1995 |
| JP | 09-045373 | 2/1997 |

(Continued)

OTHER PUBLICATIONS

Energy Density definition, pp. 1-13, available onlineat http://en.wikipedia.org/wiki/Energy_density#cite_note-4).*

(Continued)

*Primary Examiner* — Patrick Ryan
*Assistant Examiner* — Julian Anthony
(74) *Attorney, Agent, or Firm* — Dardi & Herbert, PLLC; Peter S. Dardi

(57) ABSTRACT

High performance battery packs are described especially for use in electric vehicles and plug-in hybrid electric vehicles. Based on high energy lithium ion battery designs, the battery packs can have pairs of parallel connected batteries to supply an energy capacity at full discharge of at least about 40 kilowatt-hours or in alternative embodiments a set of all series connected batteries that can produce at full discharge at least about 15 kilowatt-hours. In some embodiments, lithium rich positive electrode active materials can be used to form the batteries in which the material comprises a composition approximately represented by a formula $xLi_2M'O_3 \cdot (1-x) LiMO_2$ with x from about 0.05 to about 0.8.

34 Claims, 8 Drawing Sheets

(51) Int. Cl.
   *H01M 4/60*      (2006.01)
   *H01M 4/58*      (2010.01)
   *H01M 10/42*     (2006.01)
   *H01M 4/131*     (2010.01)
   *H01M 4/133*     (2010.01)
   *H01M 4/36*      (2006.01)
   *H01M 10/0525*   (2010.01)
   *H01M 10/48*     (2006.01)
   *H01M 2/02*      (2006.01)

(56) References Cited

U.S. PATENT DOCUMENTS

| | | |
|---|---|---|
| 6,171,723 B1 | 1/2001 | Loch et al. |
| 6,235,427 B1 | 5/2001 | Idota et al. |
| 6,251,822 B1 | 6/2001 | Peng et al. |
| 6,337,156 B1 | 1/2002 | Narang et al. |
| 6,383,687 B1 | 5/2002 | Gibbons et al. |
| 6,420,071 B1 | 7/2002 | Lee et al. |
| 6,465,986 B1 * | 10/2002 | Haba .................. 320/116 |
| 6,511,767 B1 | 1/2003 | Calver et al. |
| 6,528,208 B1 | 3/2003 | Thackeray et al. |
| 6,616,715 B2 | 9/2003 | Kitoh et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,703,163 B2 | 3/2004 | Ogura et al. |
| 6,730,429 B2 | 5/2004 | Thackeray et al. |
| 6,749,648 B1 | 6/2004 | Kumar et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,855,460 B2 | 2/2005 | Vaughey et al. |
| 6,858,349 B1 | 2/2005 | Luo et al. |
| 6,884,546 B1 | 4/2005 | Fujita et al. |
| 6,936,382 B2 | 8/2005 | Mikhaylik et al. |
| 6,951,699 B2 | 10/2005 | Yata et al. |
| 6,964,828 B2 | 11/2005 | Lu et al. |
| 7,026,074 B2 | 4/2006 | Chen et al. |
| 7,033,702 B2 | 4/2006 | Dasgupta et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,186,479 B2 | 3/2007 | Krasnov et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 * | 4/2007 | Kang et al. .......... 429/231.95 |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,907 B2 | 8/2007 | Takeuchi et al. |
| 7,273,682 B2 | 9/2007 | Park et al. |
| 7,285,334 B1 | 10/2007 | Yamashita et al. |
| 7,338,734 B2 | 3/2008 | Chiang et al. |
| 7,351,494 B2 | 4/2008 | Hennige et al. |
| 7,416,813 B2 | 8/2008 | Fujihara et al. |
| 7,435,402 B2 | 10/2008 | Kang et al. |
| 7,439,710 B2 | 10/2008 | Ishishita |
| 7,452,631 B2 | 11/2008 | Kitao et al. |
| 7,465,519 B2 | 12/2008 | Tang et al. |
| 7,497,285 B1 | 3/2009 | Radev |
| 7,507,503 B2 | 3/2009 | Amine et al. |
| 7,510,803 B2 | 3/2009 | Adachi et al. |
| 7,528,581 B2 | 5/2009 | Miyazaki et al. |
| 7,544,443 B2 | 6/2009 | Fujihara et al. |
| 7,575,830 B2 | 8/2009 | Kawamura |
| 7,629,077 B2 | 12/2009 | Bowles et al. |
| 7,718,306 B2 | 5/2010 | Cheon et al. |
| 8,067,112 B2 * | 11/2011 | Roh .................... 429/152 |
| 2002/0102462 A1 | 8/2002 | Huggins et al. |
| 2002/0122973 A1 | 9/2002 | Manev et al. |
| 2003/0077515 A1 | 4/2003 | Chen et al. |
| 2003/0087155 A1 | 5/2003 | Cho et al. |
| 2003/0099883 A1 | 5/2003 | Ochoa et al. |
| 2003/0157014 A1 | 8/2003 | Wang et al. |
| 2004/0048152 A1 * | 3/2004 | Yata et al. ............... 429/162 |
| 2004/0072072 A1 | 4/2004 | Suzuki et al. |
| 2004/0151951 A1 | 8/2004 | Hyung et al. |
| 2004/0161669 A1 | 8/2004 | Zolotnik et al. |
| 2004/0191630 A1 | 9/2004 | Kawamura et al. |
| 2005/0019670 A1 | 1/2005 | Amine et al. |
| 2005/0026037 A1 | 2/2005 | Riley, Jr. et al. |
| 2005/0031942 A1 | 2/2005 | Hennige et al. |
| 2005/0202316 A1 | 9/2005 | Hwang et al. |
| 2005/0227146 A1 | 10/2005 | Ghantous et al. |
| 2006/0051671 A1 | 3/2006 | Thackeray et al. |
| 2006/0051673 A1 | 3/2006 | Johnson et al. |
| 2006/0099472 A1 | 5/2006 | Hsu |
| 2006/0147809 A1 | 7/2006 | Amine et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0148544 A1 | 6/2007 | Le |
| 2007/0231687 A1 | 10/2007 | Kim et al. |
| 2008/0008933 A1 | 1/2008 | Lampe-Onnerud |
| 2008/0026297 A1 | 1/2008 | Chen et al. |
| 2008/0067972 A1 | 3/2008 | Takami et al. |
| 2008/0241680 A1 | 10/2008 | Lee et al. |
| 2008/0261115 A1 | 10/2008 | Saito et al. |
| 2008/0318122 A1 | 12/2008 | Sun |
| 2009/0092900 A1 | 4/2009 | Obana et al. |
| 2009/0253042 A1 | 10/2009 | Sun et al. |
| 2009/0263707 A1 | 10/2009 | Buckley et al. |
| 2009/0263721 A1 | 10/2009 | Haruna et al. |
| 2009/0297937 A1 | 12/2009 | Lampe-Onnerud et al. |
| 2009/0305131 A1 | 12/2009 | Kumar et al. |
| 2010/0068609 A1 | 3/2010 | Wang |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0056590 A1 | 3/2012 | Amiruddin et al. |
| 2012/0070725 A1 | 3/2012 | Venkatachalam et al. |
| 2012/0105007 A1 | 5/2012 | Amiruddin et al. |
| 2012/0107680 A1 | 5/2012 | Amiruddin et al. |
| 2012/0295155 A1 | 11/2012 | Deng et al. |

FOREIGN PATENT DOCUMENTS

| | | |
|---|---|---|
| JP | 10-255837 | 9/1998 |
| JP | 2000-012018 | 1/2000 |
| JP | 2002-110167 | 4/2002 |
| JP | 2003-223887 | 8/2003 |
| JP | 2003-242978 A | 8/2003 |
| JP | 2005-251684 A | 9/2005 |
| JP | 2007-066667 A | 3/2007 |
| KR | 10-2001-0043360 | 5/2001 |
| KR | 10-2003-0007651 | 1/2003 |
| KR | 10-2005-0111764 | 11/2005 |
| KR | 10-0578877 | 5/2006 |
| KR | 10-0684724 | 2/2007 |
| WO | 01/35473 A1 | 5/2001 |
| WO | 01/91209 A1 | 11/2001 |
| WO | 03/021697 A2 | 3/2003 |
| WO | 2004/084330 A2 | 9/2004 |
| WO | 2005/083829 A2 | 9/2005 |
| WO | 2006/109930 A1 | 10/2006 |
| WO | 2006/137673 A1 | 12/2006 |
| WO | 2008/086041 A1 | 7/2008 |
| WO | 2009/022848 A1 | 2/2009 |

OTHER PUBLICATIONS

Kang et al., "Enchancing the rate capability of high capacity $xLi_2MnO_3 \cdot (1-x)LiMO_2$ (M=Mn, Ni, Co) electrodes by Li-Ni-PO4

(56) References Cited

OTHER PUBLICATIONS treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Synthesis of spherical Li[Ni(1/3-z)Co(1/3-z)Mn(1/3-z)Mgz]O2 as positive electrode material for lithium ion battery," Electrochemica Acta 51 (2006)2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Lee et al., "High capacity Li[Li0.2Ni0.2Mn0.6]O2 cathode materials via a carbonate co-precipitation method," J. of Power Sources, 162 (2006), 1346-1350.

Park et al., "Physical and electrochemical properties of spherical Li1+x(Ni1/3Co1/3Mn1/3)1-xO2 cathode materials", Journal of Power Sources, 177:177-183 (2008).

Song et al., Two-and three-electrode impedance spectroscopy of lithium-ion batteries, Journal of Power Sources 111 (2002) 255-267.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Sun et al., "The preparation and electrochemical performance of solid solutions LiCoO2—Li2MnO3 as cathode materials for lithium ion batteries," Journal of Power Sources 159 (2006) 1353-1359.

Thackeray et al., "Li2MnO3-stabilized LiMO2 (M=Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn, Ni Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," Journal of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Evonik Separion 2009, "Scientific breakthrough: SEPARIONn® opens up new markets for lithium ion batteries," http://corporate.evonik.de/en/company/news/lithium_ion_batteries/Pages/separion.aspx.

"Battery Test Manual for Plug-In Hybrid Electric Vehicles," prepared for the U.S. Department of Energy, Office of Energy Efficiency and Renewable Energy, Vehicle Technologies Program, 2008.

\* cited by examiner

BATTERY PACKS FOR VEHICLES AND HIGH CAPACITY POUCH SECONDARY BATTERIES FOR INCORPORATION INTO COMPACT BATTERY PACKS

CROSS REFERENCE TO RELATED APPLICATIONS

This application claims priority to U.S. provisional patent application Ser. No. 61/369,825, filed on Aug. 2, 2010 by Kumar et al. entitled: "Battery Packs for Vehicles and High Capacity Pouch Secondary Batteries for Incorporation into Compact Battery Packs," incorporated herein by reference.

FIELD OF THE INVENTION

The invention relates to high energy pouch batteries formed with lithium rich metal oxide positive electrode active material. The invention further relates to battery packs formed with the improved design of high capacity pouch batteries with performance suitable for electric vehicles and plug-in hybrid electric vehicles.

BACKGROUND OF THE INVENTION

Lithium ion batteries are increasingly used as the electric power source in electric (EV) and plug-in hybrid electric (PHEV) vehicles. This is due to the higher energy per mass and higher energy per volume characteristics that lithium ion batteries offer versus existing battery technologies such as nickel-metal hydride, nickel-zinc and lead-acid battery systems. Rechargeable batteries are also referred to as secondary batteries, and lithium ion secondary batteries generally have a negative electrode material that intercalates lithium. For some current commercial batteries, the negative electrode material can be a carbonaceous or graphitic material, and the positive electrode material can comprise lithium cobalt oxide (LiCoO$_2$). In practice, only a relatively modest fraction of the theoretical capacity of the cathode can be used. At least two other lithium-based cathode materials are also currently in commercial use. These two materials are LiMn$_2$O$_4$, having a spinel structure, and LiFePO$_4$, having an olivine structure. These other materials have not provided any significant improvements in energy density.

Lithium ion batteries can be designed based on their application. One design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity. The high energy batteries can be designed to operate with moderate rate performance. In contrast, if the battery is designed for higher rate performance, the total energy that can be delivered from the battery generally is reduced.

SUMMARY OF THE INVENTION

In a first aspect, the invention pertains to a battery pack comprising no more than about 260 lithium ion pouch batteries arranged with pairs of batteries connected in parallel to form two strings of batteries connected in series generating an average voltage of at least about 400V at a 50% depth of discharge and having an energy capacity of at least about 40 kilowatt-hours based on full depth of discharge. Generally, each lithium ion battery has a thickness from about 7 mm to about 18 mm and a planar area from about 25,000 mm$^2$ to about 50,000 mm$^2$, and the positive electrode comprises an active composition approximately represented by a formula Li$_{1+b}$Ni$_\alpha$Mn$_{\beta-\delta}$Co$_\gamma$A$_\delta$O$_{2-z}$F$_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof. In some embodiments, the composition can be approximated by the formula x Li$_2$M'O$_3$.(1-x) LiMO$_2$ with x from about 0.05 to about 0.8.

In a further aspect, the invention pertains to a lithium ion pouch battery comprising thirty-one to thirty-seven positive electrode plates, a corresponding number of negative electrode plates stacked to alternate with the cathode plates, a separator between adjacent cathode plates and anode plates. Generally, the battery has a thickness from about 7 mm to about 18 mm and a planar area from about 25,000 mm$^2$ to about 50,000 mm$^2$, and the positive electrode comprises an active composition approximately represented with a formula Li$_{1+b}$Ni$_\alpha$Mn$_{\beta-\delta}$Co$_\gamma$A$_\delta$O$_{2-z}$F$_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof. The battery can have an energy density of at least 300 Wh/L and a total capacity of at least 45 Ah based on full depth of discharge.

In additional aspects, the invention pertains to a battery pack comprising a control system and no more than about 130 lithium ion pouch batteries connected in series generating an average voltage of at least about 400V at a 50% depth of discharge and having an energy capacity at full discharge of at least about 18 kilowatt-hours based on full depth of discharge. In general, each lithium ion battery can have a thickness from about 7 mm to about 18 mm and a planar area from about 25,000 mm$^2$ to about 50,000 mm$^2$. The positive electrode can comprise an active composition approximately represented with a formula Li$_{1+b}$Ni$_\alpha$Mn$_{\beta-\delta}$Co$_\gamma$A$_\delta$O$_{2-z}$F$_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof. The control system can be designed to monitor function of the series connected batteries for the operation of a vehicle without any parallel connections of the batteries.

In another aspect, the invention pertains to a lithium ion pouch battery comprising thirty-one to thirty-seven positive electrode plates, a corresponding number of negative electrode plates stacked to alternate with the cathode plates, a separator between adjacent cathode plates and anode plates. In some embodiments, the battery can have a thickness from about 7 mm to about 18 mm and a planar area from about 25,000 mm$^2$ to about 50,000 mm$^2$, wherein the cell has a weight from about 0.725 kg to about 1.4 kg and a specific energy of at least about 160 Wh/kg and a total capacity of at least 40 Ah based on full depth of discharge.

Moreover, the invention pertains to a battery pack comprising a control system and no more than about 110 lithium ion pouch batteries connected in series generating an average voltage of at least about 315V at a 60% depth of discharge and having an energy capacity at full discharge of at least about 15 kilowatt-hours based on full depth of discharge. Each lithium ion battery can have a thickness from about 7 mm to about 18 mm and a planar area from about 25,000 mm² to about 50,000 mm², and the positive electrode comprises an active composition approximately represented with a formula $Li_{1+b}Ni_\alpha Mn_{\beta-\delta}Co_\gamma A_\delta O_{2-z}F_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof. The control system can be designed to monitor function of the series connected batteries for the operation of a vehicle without any parallel connections of the batteries.

DETAILED DESCRIPTION OF THE INVENTION

Figure 1:
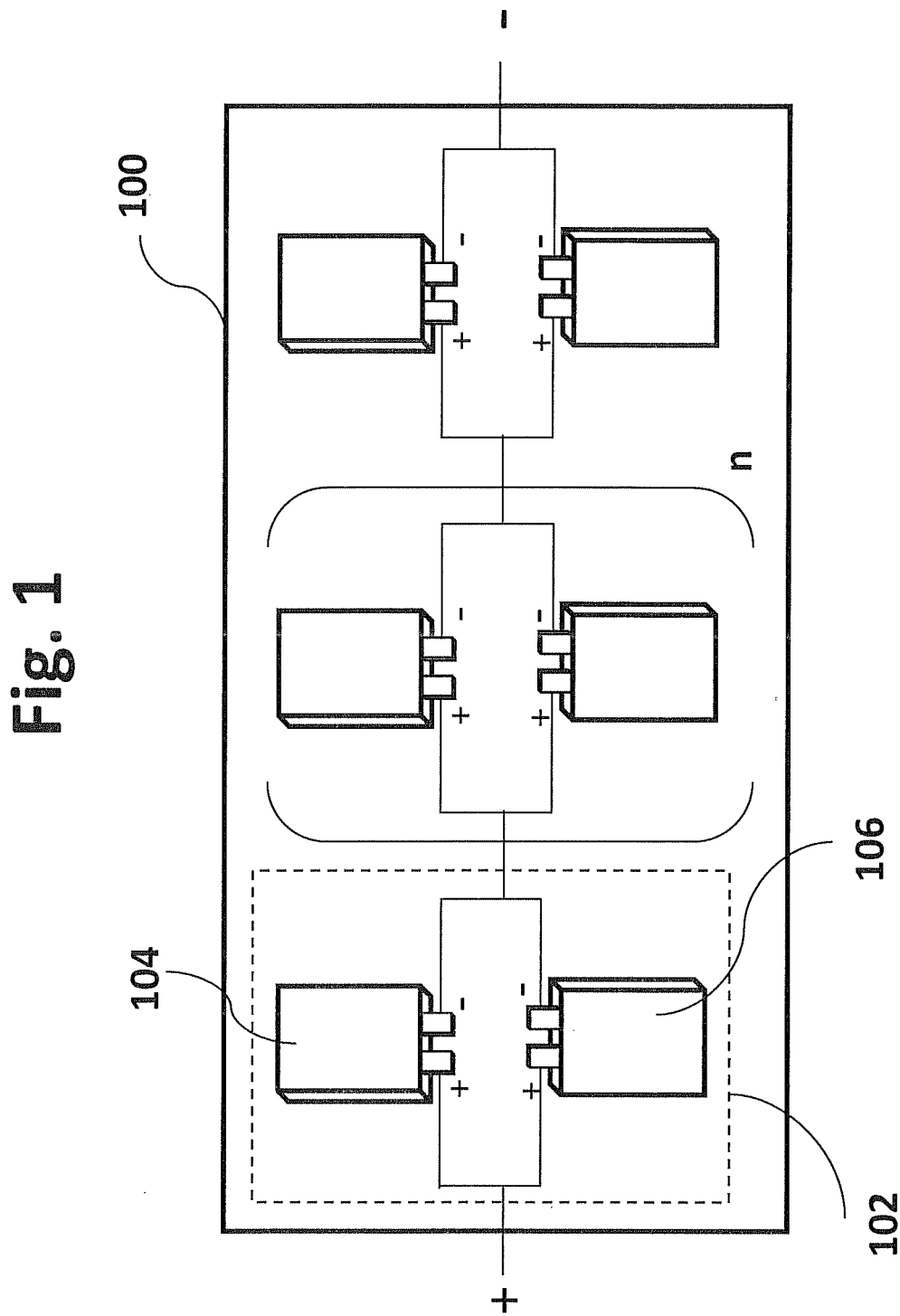
FIG. 1 is a schematic diagram of a battery pack with a string of series connected pairs of batteries connected in parallel, where n represents a selected number "n" of parallel connected battery pairs along the series connected string.

Improved battery packs have been designed around battery performance targets for electric vehicles and plug-in hybrid electric vehicles, in which the pack designs are based on lithium ion pouch secondary batteries that take advantage of high energy and high capacity properties of lithium rich positive electrode active materials. The improved pouch batteries are designed in a high capacity configuration to provide a compact design of an improved battery pack with high energy output. The positive electrode generally has an active composition approximately represented by the formula $x Li_2M'O_3 \cdot (1-x)LiMO_2$ where M is one or more metal ions having an average valance of +3 with at least one metal ion being manganese, cobalt, or nickel and M' represents one or more metal ions having an average valance of +4, and 0<x<1. In some embodiments, the positive electrode active material can comprise a composition represented by a formula $Li_{1+b}Ni_\alpha Mn_{\beta-\delta}Co_\gamma A_\delta O_{2-z}F_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof. It is desirable to design the pouch batteries to achieve a desired range of total capacity, specifically at least about 40 Ah and in some embodiments at least about 45 Ah. The battery with the specified total capacity can be designed with a number of cathode plates that allow for a suitable battery size with efficient use of space and weight as well as convenient production. Through the appropriate connection of these efficient batteries, the pouch batteries can be assembled into battery packs with an efficient format. Specifically, in some embodiments, pairs of batteries are connected in parallel that are correspondingly connected in series to generate the desired voltage. In other embodiments, the batteries are all connected in series to generate the target voltage with a corresponding lower capacity relative to packs with parallel connected batteries, although sufficient capacity can be produced for significant commercial applications. In particular, the pack can have a surprisingly small size and weight while producing appropriate performance for an electric vehicle or a plug-in hybrid electric vehicle.

A battery pack designed for an electric vehicle or a plug-in hybrid electric vehicle can have particular design targets. In particular, for vehicle use the battery pack can be designed to provide a particular energy capacity over an appropriate voltage range such that the vehicle would have a corresponding desired driving range. Thus, in some embodiments, it is desirable for the battery pack to supply at least about 40 kilowatt-hours fully discharged capacity at an average voltage of at least 400 volts to a depth of discharge for the battery of about 50%. In alternative embodiments, the battery packs can be designed to generate 20 kilowatt-hours fully discharged capacity using a single string of series connected batteries. For vehicle applications, it is desirable for the battery pack to have a small size and weight. If the battery pack is smaller, more space is available in a vehicle for other purposes and a lower weight provides various efficiencies. Based on the improved pouch batteries described herein, a smaller number of batteries can be assembled into the battery pack to achieve a desired energy capacity for the pack with corresponding advantages described further below. All performance parameters discussed herein are at room temperature unless indicated otherwise.

To achieve the life requirements of vehicle systems, it is desirable for batteries to last many thousands of charge/discharge cycles equating to 5 to 15 years of the vehicle's useful life. In order to achieve better performance over an extended life, only a portion of the battery's total energy generally may be used per charge/discharge cycle. This portion, referred to as the depth of discharge (DOD) of the battery, is a major factor in determining the overall battery pack size required to achieve the vehicle's specified driving range (miles per charge). For example, with respect to an automobile that uses 20 kilowatt-hours of effective energy to meet the driving range and utilizes a battery pack system that requires 50% DOD in order to achieve the cycle life targets, the automobile is designed to have a battery pack with about 40 kilowatt-hours of total energy when fully discharged. Similarly, in some embodiments smaller battery packs can be designed for plug-in hybrid electric vehicles (PHEV) having similar advantages based on the use of the lithium-rich positive electrode active materials for the pouch batteries as compared to batteries formed, for example, with $LiMn_2O_4$ or $LiFePO_4$. These smaller packs can yield energy in the ranges of about 20 kilowatt-hours of total energy when fully discharged while providing approximately 400V average voltage when discharged to 50% DOD. Another smaller pack design of interest with at least about 16 kWh of total energy at full discharge is designed for operation with a 60% DOD and with a total average voltage for the pack of about 315V. The individual batteries designed for operation down to 60% depth-of-discharge can generate an average voltage of about 3.25V at a 1C discharge rate.

The DOD is referenced to a batteries rated capacity, which can be the amount of capacity removed relative to a fully charged condition. To some degree, the rated capacity can be set as desired within the extremes of the operating range of the battery, but then the performance is referenced to this value. During the first charge-discharge significant irreversible changes take place in lithium ion battery resulting in a large first cycle irreversible capacity loss. After the first cycle, irreversible changes take place much more gradually in the battery with cycling. All performance parameters described herein are based on cycling of a battery after the first cycle but prior to significant changes in the performance based on longer term cycling. In principle, the DOD can be reduced from 100% DOD based on a decrease of the charge voltage, a decrease in the minimum discharge voltage or a combination thereof.

The selected DOD can be based on desired long cycling performance while still achieving desired performance parameters, and pack designs can account for a small portion of excess performance capability. For example, the 100% DOD can be referenced for batteries using the lithium rich metal oxide cathode active materials to a discharge from 4.5V to 2V at a rate of C/3 after a formation cycle of the battery. While packs are designed around particular performance at selected DOD, the actual DOD during use may vary. During actual use, a user charges and discharges the pack within the ranges set with a target DOD. Also, during cycling, the DOD can be varied over the lifetime of the pack in actual use. For example, the DOD can be expanded with an older pack to increase capacity that may be lost due to performance changes of the battery at long term cycling.

Lithium has been used in both primary and secondary batteries. An attractive feature of lithium metal is its light weight and the fact that it is the most electropositive metal, and aspects of these features can be advantageously captured in lithium ion batteries also. For example, certain forms of metals, metal oxides, and carbon materials are known to incorporate lithium ions into its structure through intercalation, alloying or similar mechanisms. Desirable mixed metal oxides are described further herein to function as active materials for positive electrodes in secondary lithium ion batteries. Lithium ion batteries refer to batteries in which the negative electrode active material is also a lithium intercalation material. If lithium metal itself is used as the anode or negative electrode active material, the resulting battery generally is simply referred to as a lithium battery.

The batteries described herein are lithium ion batteries generally using a non-aqueous electrolyte that comprises lithium ions. For secondary lithium ion batteries, lithium ions are released from the negative electrode during discharge with the generation of electrons from the oxidation of lithium upon its release from the electrode. Correspondingly, the positive electrode takes up lithium ions through intercalation or the like during discharge which neutralizes the resulting composition with the consumption of electrons. Upon recharging of the secondary cell, the flow of lithium ions is reversed through the cell with the negative electrode taking up lithium and with the positive electrode releasing lithium as lithium ions.

The word "element" and a reference to a specific element of the periodic table are used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental foim or a corresponding alloy of the metal's elemental form. In other words, a metal oxide or other metal composition, other than metal alloys, generally is not metallic.

In a battery pack to power a vehicle, the individual batteries can be connected both in series and in parallel. Sets of batteries are connected in series to boost the voltage relative to individual batteries. The strings of series connected batteries can be connected in parallel provides the desired current capacity of the pack. In some embodiments based on the improved high capacity pouch batteries described herein, pairs of batteries are connected in parallel to provide a desired capacity, e.g. 20 Ah at 50% depth-of-discharge. The pairs of batteries are connected in series to generate the desired average voltage with the current capacity provided by the battery pairs, e.g., 400 volts. A schematic diagram of the connections of batteries within the battery pack is shown in FIG. 1. Battery pack 100 comprises pairs 102 of batteries 104, 106 connected in parallel. As shown in FIG. 1, n+2 pairs of batteries are connected in series.

Smaller battery packs can be designed with all of the batteries connected in series while also generating 400 volts as an average voltage with a discharge of a 50% depth-of-discharge. Compared with the packs described in the previous paragraph, these packs would generate about 10 Ah at 50% depth-of-discharge with only a single set of batteries in series without any parallel connections. For example, 105 pouch batteries as described herein can be connected in series to provide the desired performance parameters. The smaller packs can provide advantages with respect to a lower cumulative cost of the batteries, a lower cost to connect and monitor the batteries, a greater reliability of the packs and a reduction in weight and size of the packs. The small battery pack also provides a cost savings with respect to thermal cooling while providing suitable performance for many consumers. For these smaller packs, only one member of each pair shown in FIG. 1 would be present. In alternative embodiments, an efficient pack can be designed for generating an average voltage of about 315 volts with a discharge of a 60% depth-of-discharge and the battery capacities can be designed to produce a desired energy production over the operating range of the pack.

The particular configuration of the battery pack can be designed for compatibility with a control apparatus for the pack. The connections with the control apparatus can be adapted based on the configuration of the batteries in the pack with respect to series and parallel connections. For example, subsets of batteries can be connected in series as a module and the modules are correspondingly connected appropriately to provide the net configuration of the batteries within the entire pack, such as described in U.S. Pat. No. 7,528,581 to Miyazaki et al. entitled "Battery Apparatus for Controlling Plural Batteries and Control Method for Plural Batteries," incorporated herein by reference.

A battery pack for an electric vehicle or a plug-in hybrid electric vehicle generally can have an average voltage requirement of about 400V, although alternative embodiments are described with performance designed around 315V. As described further below, using the high capacity positive electrode active material described herein, the individual batteries can deliver an average voltage of approximately at least about 3.6V at 50% depth-of-discharge. Thus, in some embodiments, a battery pack based on the positive electrode active materials described herein can incorporate 111 batteries in series, at 3.6 volts per cell average voltage to provide the 400 volts with a discharge of a 50% depth of discharge. If desired, for this embodiment as well as for the embodiments based on a single set of series connected batteries, additional batteries can be included in the series connections to provide a comfort margin with respect to modest potential voltage shortfall at the desired current capacity, which may occur due to long term cycling of the batteries. In the alternative embodiments with a 60% depth-of-discharge, the individual batteries are designed to produce an average voltage of 3.27V with a 60% DOD. To produce the desired 315V performance, at least about 92 batteries are connected in series, and a larger number of batteries, such as 96 can be connected in series to provide additional comfort on the average voltage value.

In comparison, a value of 3.8 volts per cell is the approximate, single cell average voltage for the lithium manganese oxide (LiMn$_2$O$_4$) system miming at 50% depth of discharge (DOD). To attain 40 kilowatt-hours of total energy with the lithium manganese oxide system, each cell in series then generates 380 watt-hours, equating to 100 ampere-hours. Due to size, thickness and manufacturing issues accounting for the capacity of the lithium manganese oxide system, the 100 ampere-hour capacity would generally be split into smaller battery units, which for lithium manganese oxide based batteries can involve three or more cells in parallel with batteries having desirable ranges of parameters. Therefore, for lithium manganese oxide based batteries, the 40 kilowatt-hour total energy target can be met by 105 sets of three or more parallel groupings of cell strung together in series. For three-cell parallel groupings, the total number of cells would be 315, for four-cell parallel groupings, the total number of cells would be 420, and so on for larger numbers of batteries in parallel connected groupings. Based on the improved high capacity pouch batteries described herein, the packs can be based on only two strings of batteries connected in parallel or alternatively based on a single string of batteries connected in parallel, while meeting the target performance properties, with a corresponding significant reduction in total numbers of batteries.

The specific capacity and energy of the lithium rich positive electrode material for the pouch batteries described herein is compared to LiMn$_2$O$_4$ and LiFePO$_4$ in Table 1.

TABLE 1

| Cathode Material | Specific Capacity (mAh/g) | Average Voltage vs. LiC$_x$ with 50% DOD (Volts) | Specific Energy (mWh/g) |
| --- | --- | --- | --- |
| $x$LiMO$_2$·(1 − x)Li$_2$M'O$_3$ | 220 | 3.6 | 792 |
| LiMn$_2$O$_4$ | 120 | 3.8 | 456 |
| LiFePO$_4$ | 170 | 3.2 | 544 |

The high energy positive electrode active material, when used to form batteries to provide a 400V, 40 kilowatt-hour battery pack as described above, yields a battery pack with 111 batteries in series and only two strings of batteries in parallel, thus yielding 222 batteries total for the battery pack, which is significantly less than the 315 or 420 cells required for the pack based on LiMn$_2$O$_4$. Providing a pack solution with fewer individual batteries has many advantages including, for example, a lower cumulative cost of the batteries, a lower cost to connect and monitor the cells, a greater reliability of the pack, reduced weight and size, and a relative ease of pack assembly as well as reducing the corresponding monitoring function for the pack. Similar comparisons follow for 20 kilowatt-hour battery packs.

In some embodiments, the positive electrode active materials can comprise lithium rich lithium metal oxide compositions that generally are believed to form a layered composite structure. In some embodiments, the positive electrode of the battery can comprise at least about 92 weight percent of positive electrode active material. The active material can optionally have a fluorine dopant that substitutes for oxygen and/or a stabilizing coating, such as about 0.5 nanometers (nm) to about 20 nm metal fluoride as a coating, although additionally or alternatively other stabilizing coatings other than metal fluorides can be used to coat the active material. Alternatively or additionally, the positive electrode active material can comprise a composition approximately represented with the formula Li$_{1+b}$Ni$_\alpha$Mn$_{\beta-\delta}$Co$_\gamma$A$_\delta$O$_{2-z}$F$_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2, wherein A is a metal dopant distinct from Ni, Mn and Co, or combinations thereof. In some embodiments, element A can be, for example, Mg, Sr, Ba, Cd, Zn, Al, Ga, B, Zr, Ti, Ca, Ce, Y, Nb, Cr, Fe, V or combinations thereof. The positive electrode of the battery can additionally comprise about 0.1 to about 5 weight percent electrically conductive agents and about 0.5 to about 7.9 weight percent polymer binder. As described below, the cathode active material can have an inorganic coating that further stabilizes the material during cycling.

The lithium rich positive electrode active materials described herein can exhibit very high capacities when cycled to a charge voltage of 4.5V. In particular, the cathode active materials can exhibit specific capacities of greater than about 220 mAh/g. Also, the materials can exhibit good cycling at a high depth of discharge with the use of high voltage electrolytes and with stabilizing additives. The stabilizing of the cycling of these materials is described further in published U.S. patent application 2011/0136019 to Amiruddin et al. ("the '019 application"), entitled "Lithium Ion Battery With High Voltage Electrolytes and Additives," incorporated herein by reference. It can be expected that with cycling to a depth of discharge of 50%, the batteries can exhibit stable cycling out to large numbers of cycles.

Figure 2:
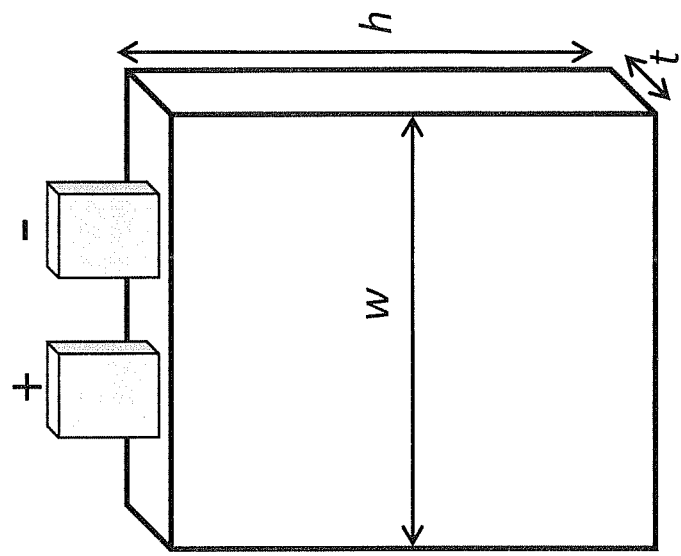
FIG. 2 is a perspective view of a pouch battery with various dimensions labeled.

The design of the individual batteries around the high energy positive electrode active material can provide for batteries with a high capacity within a practical format. Pouch batteries are generally approximate rectangular parallelepipeds, excluding the connection tabs and other potential features around the edges, characterized by a thickness (t) and a planar area with a width (w) and a height (h) in which the thickness is generally significantly less than the linear dimensions (width and height) defining the planar area (w·h), as shown schematically in FIG. 2. In particular, the batteries can have a thickness between about 7 mm and about 18 mm. The area of the pouch battery can range from about 25,000 mm$^2$ to about 50,000 mm$^2$, in which the linear dimensions of width and height defining the area generally range from about 50 mm to about 750 mm.

The resultant individual battery generally can have a discharge energy density of at least about 160 Wh/kg when discharged from 4.5V to 2.0V. In some embodiments, the resultant battery can have a discharge energy density of at least about 200 Wh/kg, in other embodiments from about 250 Wh/kg to about 400 Wh/kg when discharged from 4.5V to 2.0V. In further embodiments, the battery can have a volumetric discharge energy density of at least about 300 Wh/l. In some embodiments, the resultant battery can have a volumetric discharge energy density of at least about 500 Wh/l to 1150 Wh/l when discharged from 4.5V to 2.0V.

Some of the positive electrode material compositions described herein have a low risk of fire for improved safety properties due to their specific compositions with a layered structure and reduced amounts of nickel relative to some other high capacity cathode materials. Also, these compositions use low amounts of elements that are less desirable from an environmental perspective, and can be produced from starting materials that have reasonable cost for commercial scale production.

Smaller pouch batteries have been described based on similar positive electrode active materials in published U.S. patent application 2009/0263707A to Buckley et al. ("the '707 application"), entitled "High Energy Lithium Secondary Batteries," incorporated herein by reference. Batteries with long cycling performance have been described based on similar positive electrode active materials in published U.S. patent application 2011/0017528 to Kumar et al. ("the '528 application"), entitled "High Energy Lithium Secondary Batteries," and U.S. patent application Ser. No. 12/732,520 to Amiruddin et al. ("the '520 application"), entitled "High Voltage Battery Formation Protocols and Control of Charging and Discharging for Desirable Long Term Cycling Performance," both are incorporated herein by reference.

With the target battery pack parameters noted above, it has been found that adaptation of the pouch batteries using larger formats provide for particularly efficient pack designs without compromising performance and with design parameters that can be readily produced in commercial quantities using available equipment. For suitable performance as a secondary battery, the electrode construction has constraints on the design so that the batteries cycle for long numbers of cycles, which is needed to have a reasonable battery pack for actual commercial use.

To have stable long term cycling, the battery electrodes for secondary batteries generally have thicknesses that are relatively thin in comparison with primary batteries. Also, the negative electrodes generally comprise a lithium intercalation or alloying composition or the like since elemental lithium metal in negative electrodes has not produced stable long term cycling. In particular, graphitic carbon has been successfully used as a negative electrode active material for lithium ion batteries with stable long term cycling, although other negative electrode active materials are described below. To achieve the desired battery capacities, the batteries can be designed to include 20 to 50 positive electrode plates with corresponding negative electrode plates in which the electrodes are connected in parallel within the pouch. The electrodes can be designed to have a planar area such that the pouch battery has a selected planar area, which is slightly larger than the electrode planar area. To accommodate the overall battery design, the electrodes are stacked in an alternating pattern, connected in parallel, and sealed within the pouch with the electrolyte.

Battery Pack Design

The improve battery pack designs are based upon the realization that the use of improved high energy positive electrode active materials provides the ability to design high energy pouch batteries with a reasonable footprint and electrode stack design while having the ability to produce a total capacity of at least about 40 Ah, and in some embodiments at least about 45 Ah. In some embodiments, due to the high capacity of the individual cells, only two batteries with appropriate sizes connected in parallel have the ability to produce the desired high energy output for the pack. Specifically, each pair of cells then produces a total current capacity of 100 Ah. During charging and discharging the same quantity of current is drawn from each pair of cells connected in series. The total voltage is the added voltage from each battery pair. In other embodiments, all of the cells are connected in series so that no cells are connected in parallel. The resulting smaller pack can still produce at least about 18-20 kilowatt hours with a full depth-of-discharge based on 400 volts average voltage with a 50% depth-of-discharge. An alternative pack design is based on 315 volt average voltage performance with a 60% depth-of-discharge with roughly 92-100 batteries connected in series. Using slightly larger cells, for example, with about 51 Ah capacity, these alternative packs can still generate generally at least about 15 kilowatt hours of energy at full discharge.

With respect to the embodiments based on pairs of pouch batteries connected in parallel, the battery pack can comprise from about 222 batteries to about 260 batteries, in further embodiments from about 226 to about 250 and in further embodiments from about 230 batteries to about 240 batteries. Since the batteries are connected in pairs in the desired pack design, these values correspond with a series connection of from about 111 pairs to about 130 pairs of batteries, in further embodiments from about 113 pairs to about 125 pairs and in other embodiments from about 115 pairs to about 120 pairs of batteries in series connection to generate the 400 V average voltage with a 50% depth of discharge. A person of ordinary skill in the art will recognize that additional ranges within the explicit ranges of battery numbers above are contemplated and are within the present disclosure.

In some embodiments, the design parameters are generally based on a battery pack voltage of at least about 400V average voltage with a 50% depth of discharge and an energy capacity of at least about 40 kilowatt-hours at full discharge or 20 kilowatt-hours at 50% depth of discharge. In practice, actual battery packs can exceed these targets and the targets can be increased in some embodiments while still being able to take advantage of the desirable pack design described herein. In particular, with respect to the energy capacity, the energy capacity can range in some embodiments from about 40 kilowatt-hours to about 80 kilowatt-hours, in further embodiments from about 45 kilowatt-hours to about 78 kilowatt-hours and in other embodiments from about 50 kilowatt-hours to about 75 kilowatt-hours. The extra energy capacity can be used to provide greater functionality to a vehicle, such as added features or a more powerful engine, or to increase the driving range of the vehicle between charges. Similarly, the voltage target of the pack can be increased or decreased with a corresponding change in the number of battery pairs connected in series in order to produce the desired average voltage with a 50% depth of discharge. A person of ordinary skill in the art will recognize that additional ranges of energy capacity within the explicit ranges above are contemplated and are within the present disclosure.

With respect to the embodiment with the batteries all connected in series, the design parameters can also be based on a pack voltage of at least about 400V average voltage with a 50% depth of discharge. In this embodiment, the pack can be constructed with a series connection of from about 111 batteries to about 130 batteries, in further embodiments from about 113 batteries to about 125 batteries and in other embodiments from about 115 batteries to about 120 batteries of batteries in series connection to generate the 400 V average voltage with a 50% depth of discharge. These packs can generate at full discharge at least about 18 kilowatt-hours, in some embodiments from about 20 kilowatt-hours to about 40 kilowatt-hours, in further embodiments from about 22 kilowatt-hours to about 39 kilowatt-hours and in other embodiments from about 25 kilowatt-hours to about 37 kilowatt-hours. A person of ordinary skill in the art will recognize that additional ranges within the explicit ranges of battery numbers and kilowatt-hours above are contemplated and are within the present disclosure.

In alternative embodiments with all of the batteries connected in series, the pack is designed to generate 315V average voltage with a 60% DOD. In this embodiment, the pack can be constructed with a series connection of from about 92 batteries to about 110 batteries, in further embodiments from about 94 batteries to about 100 batteries and in other embodiments from about 95 batteries to about 98 batteries of batteries in series connection to generate the 315 V average voltage with a 60% depth of discharge. These packs can generate at full discharge at least about 15 kilowatt-hours, in some embodiments from about 16 kilowatt-hours to about 30 kilowatt-hours, and in further embodiments from about 17 kilowatt-hours to about 25 kilowatt-hours. A person of ordinary skill in the art will recognize that additional ranges within the explicit ranges of battery numbers and kilowatt-hours above are contemplated and are within the present disclosure.

The battery packs with pairs of batteries connected in parallel can provide extended range for the vehicles without operation of an internal combustion engine or plugging in the vehicle based on the relatively large energy capacity. On the other hand, the pack with all of the batteries connected in series would have significantly lower cost for the batteries as well as a simpler design based on simpler connection of the batteries. With the simpler connection of the batteries, the costs for connecting the batteries and the monitoring function would be correspondingly reduced. As noted above, the control and monitoring function for battery packs can be organized around series connected batteries, as described in U.S. Pat. No. 7,528,581 to Miyazaki et al. ('581 Miyazaki patent) entitled "Battery Apparatus for Controlling Plural Batteries and Control Method for Plural Batteries," incorporated herein by reference. With a single set of series connected batteries, for example, the control apparatus described in the '581 Miyazaki patent can be simplified to a single module for one set of series connected batteries with a corresponding significant simplification of the apparatus. Other advantages of the smaller pack include, for example, reduced weight and size and a greater reliability of the pack. While the pack with a single set of series connected batteries has a lower available energy, the advantages can compensate for the reduced total energy if a smaller energy range for a vehicle is acceptable.

Battery Cell Design

In the desired formats, high energy positive electrode materials described herein can be effectively incorporated into the batteries to achieve extremely high performance values. In particular, the ability to synthesize high energy density electroactive materials with a high tap density has been found to allow for positive electrodes at high active material loadings. It has also been found that high molecular weight polymers allow for the formation of electrodes with low amounts of polymers without compromising the mechanical stability of the electrodes or the electrode performance. Based on these important advances, batteries can be formed having very high energy densities as well as high volumetric energies. When assembled into the pouch battery formats of interest, the batteries can be effectively assembled in the battery packs with the desired performance and improved designs.

Figure 3:
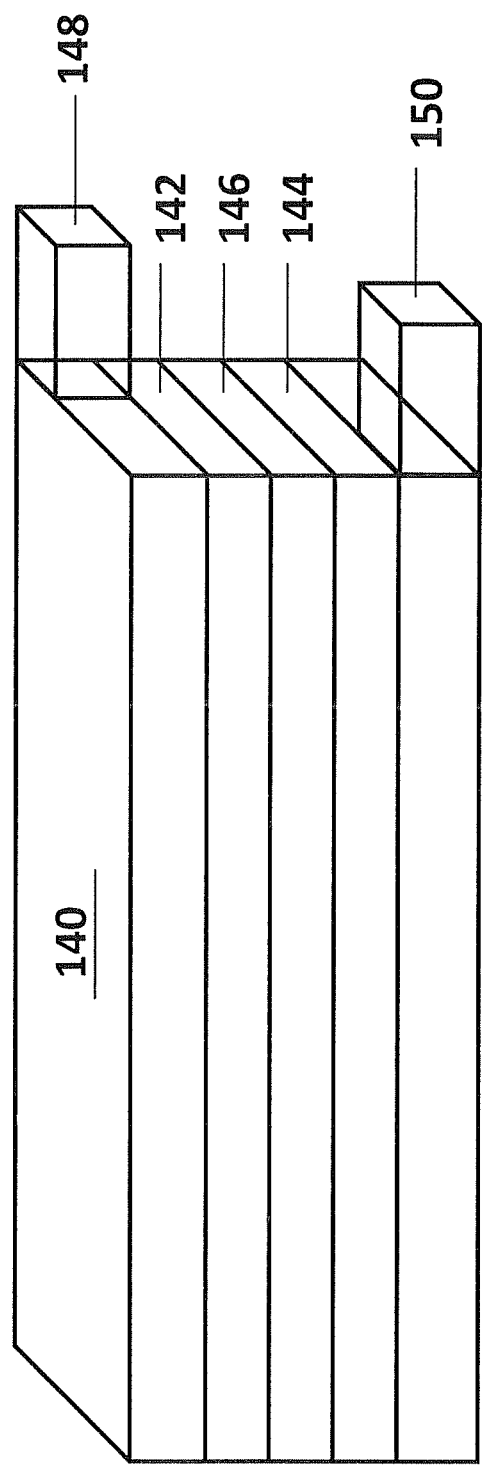
FIG. 3 is a schematic perspective view of a battery stack with a single positive electrode and negative electrode separated from a case.

A schematic diagram of a battery stack without a casing is shown in FIG. 3. Specifically a battery 140 is shown schematically having a negative electrode 142, a positive electrode 144 and a separator 146 between negative electrode 142 and positive electrode 144. As described in detail below, a battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 148, 150 associated respectively with negative electrode 142 and positive electrode 144. The electrode stack can be contacted with an electrolyte comprising lithium ions and generally a non-aqueous liquid. The electrode stack and electrolyte generally are sealed within a suitable container.

The electrodes described herein generally can be incorporated into various commercial battery designs. For example, the cathode compositions generally can be used for prismatic shaped batteries, wound cylindrical batteries, coin batteries, pouch batteries or other reasonable battery shapes. However, for the formation of the desired battery packs for vehicles, pouch batteries are of particular interest due to their efficient packing, low packaging weight and convenient format for stacking electrodes. Pouch cell battery format generally allows tailoring to desired battery dimensions and makes the most efficient use of available space and can sometimes achieve a packaging efficiency of 90 to 95 percent, the highest among battery packs. Because of the absence of a metal can, the pouch cells are generally relatively light. In particular, the pouch battery can comprise a stack of alternating positive electrodes and negative electrodes with separators between adjacent electrodes of different polarity. Generally, the plurality of electrodes is connected in parallel to increase the current at the voltage established by pairs of a positive electrode and a negative electrode. The resulting batteries generally are designed to have desirable cycling properties for secondary battery use over multiple cycling of the batteries.

Smaller pouch batteries have been described based on similar positive electrode active materials in the '707 application cited above. Batteries with long cycling performance have been described based on similar positive electrode active materials in the '520 application cited above. Batteries with supplemental lithium have been found to have improved cycling performance as described in U.S. patent application Ser. No. 12/938,073 to Amiruddin et al. entitled: "Lithium Ion Batteries with Supplemental Lithium", incorporated herein by reference.

Long term cycling with reasonable performance has been obtain with cycling of a battery with a lithium rich metal oxide cathode material between 4.3V and 2.5V, as described in the '528 application cited above. This good cycling performance is obtained at a relatively large DOD represented by this voltage range. Additionally, voltage windows has been found to be particularly important as described in copending U.S. Provisional Patent Application 61/380,004 to Amiruddin et al. entitled: "Voltage Windows to Control Material Structure of Layered-Layered Lithium Rich Positive Electrode Active Compositions", incorporated herein by reference.

For stable cycling, the individual electrodes for secondary batteries generally are not made too thick. Since the electrodes are not too thick, a stack of electrodes is used to provide a desired capacity. Also, the area of the face of the electrodes can be increased to provide a greater capacity, but it can be desirable to limit the area of an electrode due to handling considerations for both the electrodes during processing to form the battery as well as the resulting batteries that are assembled into the packs. Thus, there are practical limits on increasing the battery capacity based solely on increasing the battery size. However, the use of the lithium rich high energy positive electrode active materials provides the ability to form a pouch battery that achieves desired capacity levels within the practical physical constrains on the pouch battery construction. In particular, it is generally desirable for the surface area to be not too large for practical and performance reasons, and the thickness is generally desired to be within certain boundaries for convenient manufacturing.

A pouch battery comprises a battery structure sealed within a somewhat flexible pouch. The current collectors of the battery structure are electrically connected to conductive tabs that extend from the pouch when the pouch is sealed so that the tabs can be used to connect the battery to an external circuit. The pouch seals around the battery structure and can generally form a hermetic seal to maintain the electrolyte within the battery while keeping out water vapor. The pouch can be formed from a laminate material that generally comprises an aluminum foil or the like with polymer layers. The aluminum foil can provide appropriate form and mechanical strength to the pouch material. Generally each side of the aluminum foil is covered with one or more polymer layers. Appropriate seals can be formed around the protruding connection tabs, such as with a heat seal formed with a thermoplastic polymer. Pouch battery components and the formation of pouch batteries is described further in, for example, U.S. Pat. No. 7,285,334 to Yamashita et al., entitled "Material for Packaging Cell, Bag for Packaging Cell, and its Production Method," and published U.S. patent application 2008/0241680 to Lee et al., entitled "Pouch Type Lithium Secondary Battery," both of which are incorporated herein by reference.

Figure 4:
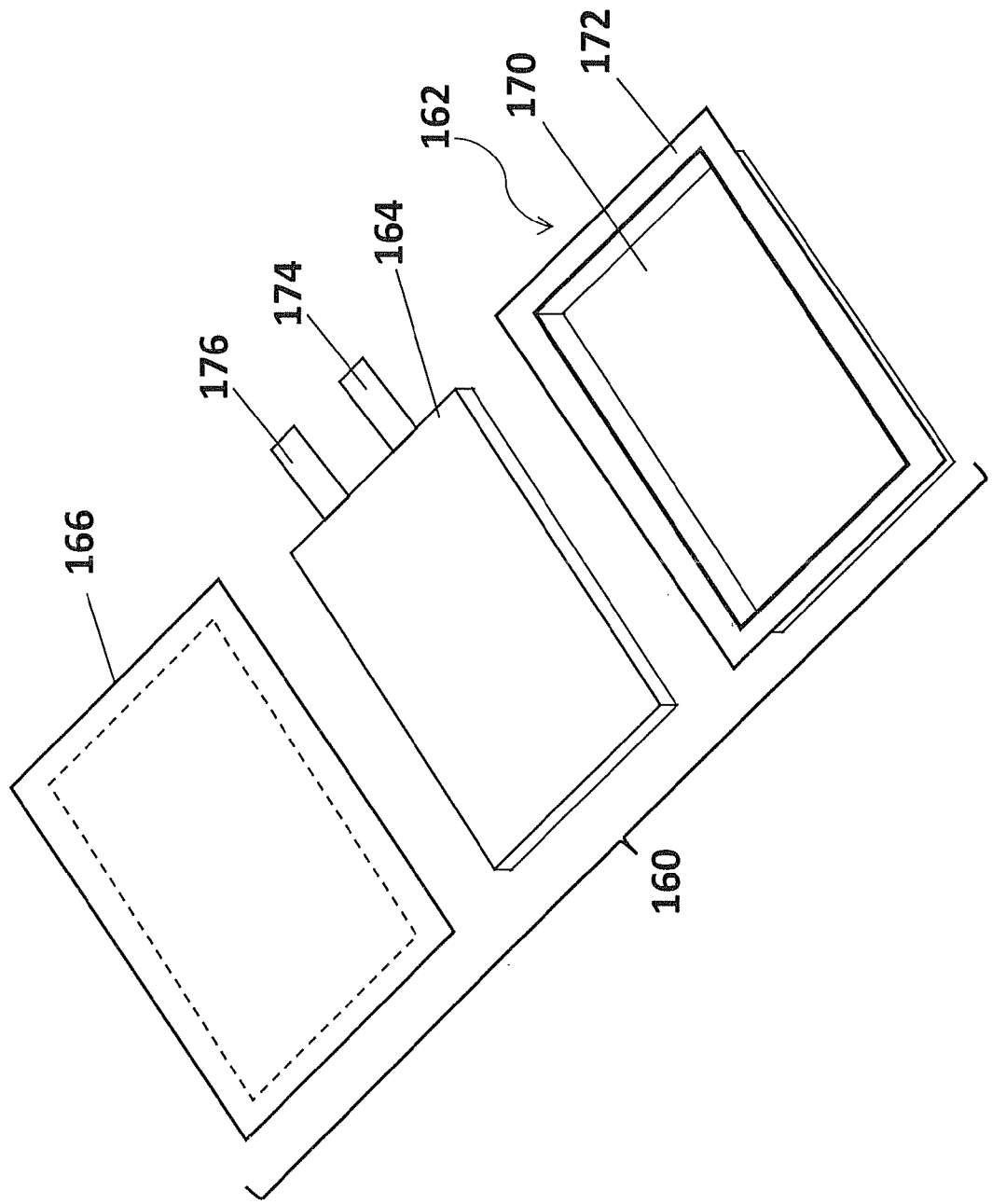
FIG. 4 is an exploded view of an embodiment of a pouch battery with a battery core separated from two portions of the pouch case.
Figure 6:
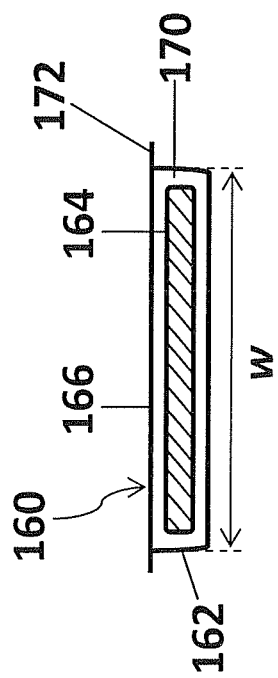
FIG. 6 is a bottom plan view of the pouch battery of FIG. 5.
Figure 5:
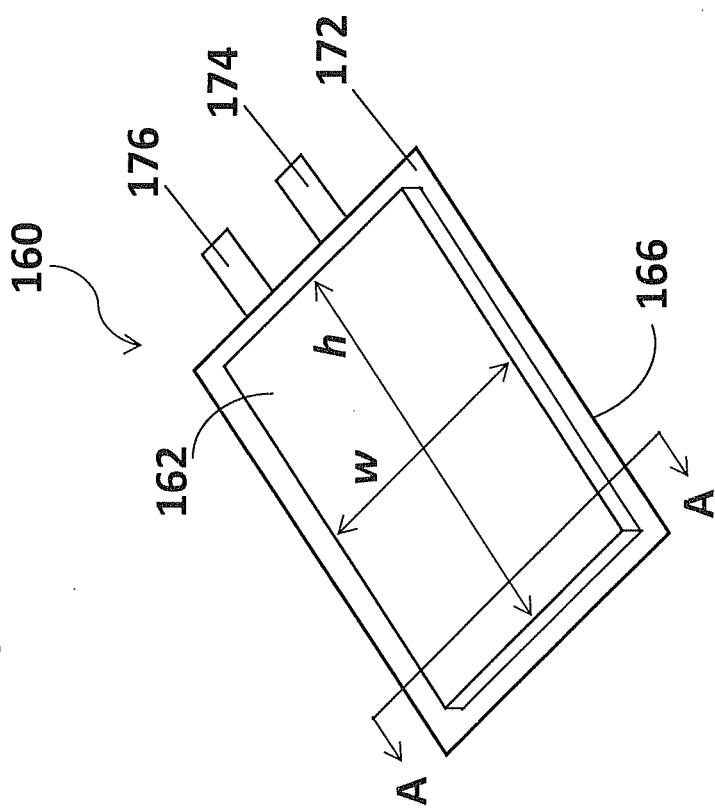
FIG. 5 is a perspective lower face view of the assembled pouch battery of FIG. 4.

A representative embodiment of a pouch battery is shown in FIGS. 4-6. In this embodiment, pouch battery 160 comprises pouch enclosure 162, battery core 164 and pouch cover 166. Pouch enclosure 162 comprises a cavity 170 and edge 172 surrounding the cavity. Cavity 170 has dimensions such that battery core 164 can fit within cavity 170. Pouch cover 166 can seal around edge 172 to seal battery core 164 within the sealed battery, as shown in FIGS. 5 and 6. Referring to FIG. 5, the pouch enclosure 162 is sealed with the pouch cover 166 along edge 172 to form the pouch battery 160. Terminal tabs 174, 176 extend outward from the sealed pouch for electrical contact with battery core 164. FIG. 6 is a schematic diagram of a cross section of the battery of FIG. 5 viewed along the A-A line. Specifically, battery core 164 is shown to be encased inside the cavity 170 of the pouch enclosure 162 sealed along the edge 172 with pouch cover 166 to form the pouch battery 160. Many additional embodiments of pouch batteries are possible with different configurations of the edges and seals. However, reasonable configurations of the pouch batteries can take advantage of the desired design parameters described herein.

While battery core 164 can comprise folded electrodes or the like in principle, in the embodiments of particular interest herein the electrodes are stacked. With high loadings of active materials in the electrodes, the resulting electrodes may not have desirable properties for folding. Thus, the battery cores can comprise a stack of positive electrodes and negative electrodes with a sheet of separator between adjacent electrodes of opposite parity. For secondary batteries designed to operate at reasonable rates for most applications, it has been found that the electrodes perform appropriately if they are not too thick.

While pouch cells do not have fixed standard sizes similar to cylindrical cells, there are conventional formats with respect to ranges of thicknesses. Thus, in embodiments of particular interest, the pouch batteries have thickness of no more than about 18 mm, in some embodiments from about 7 mm to about 17 mm, and in further embodiments from about 8 mm to about 15 mm, in other embodiments from about 9 mm to about 12.5 mm. Similarly, the pouch batteries can have from 20 to 50 positive electrode plates, in further embodiments from 25 to 45 and in other embodiments from 30 to 38 positive electrode plates. A corresponding number of negative electrodes are used in the stack. In some embodiments, the pouch battery has a weight from about 0.5 kg to about 2.0 kg. A person of ordinary skill in the art will recognize that additional ranges of thicknesses and numbers of plates within the explicit ranges above are contemplated and are within the present disclosure.

Both the pouch battery and the electrodes are characterized by a facial area roughly orthogonal to the thickness dimension with the battery facial area being slightly larger than the electrode facial area due to the packaging material. For convenience, the facial area of the pouch battery is considered in more detail. As used with reference to specific areas, the facial area of the pouch battery excludes any thin edges, tabs or the like that extend from the bulk of the pouch volume. Specifically, as referred to herein, the facial area of the battery only considers the facial area along the bulk thickness of the battery. The facial area of the pouch battery can be characterized by a width (w) and height (h) as noted in FIGS. 5 and 6. Thin edges of the battery may be used in practice for the assembly of the pouch battery into a pack, module or the like and terminal tabs or the like can be used for connecting the battery to an external circuit.

While it would seem possible to form a facial area of the pouch battery as large as desired, there are practical constraints on the dimensions for convenient handling at practical costs. The desired facial area of the pouch battery can range from about 25,000 mm$^2$ to about 50,000 mm$^2$ and in further embodiments from about 30,000 mm$^2$ to about 45,000 mm$^2$. Furthermore, the pouch battery can have a volume from about 250,000 mm$^3$ to about 550,000 mm$^3$, in further embodiments from about 300,000 to about 500,000 mm$^3$, and in additional embodiments from about 325,000 mm$^3$ to about 450,000 mm$^3$. The width of the pouch battery can range from about 50 mm to about 500 mm, in further embodiments from about 65 mm to about 450 mm, and in other embodiments from about 75 mm to about 400 mm. Similarly, the height of a pouch battery can range from about 75 mm to about 750 mm, in further embodiments from about 85 mm to about 700 mm and in other embodiments from about 100 mm to about 650 mm. A person of ordinary skill in the art will recognize that additional ranges of battery dimensions within the explicit ranges above are contemplated and are within the present disclosure.

Appropriate electrically conductive tabs can be welded or the like to the current collectors to form current collector tabs. Generally, the electrode plates in the stack of like polarity are connected in parallel. In other words, current collector tabs of the positive electrodes are connected, e.g., welded or the like, to a common electrical conductive element, and the current collector tabs of the negative electrodes are connected to a common electrical conductive element. Suitable electrically conductive elements include, for example, a metal strip, wire or the like. With a parallel connection, the capacity of the battery is the sum of the capacities available from the individual electrodes. The battery core can be placed into the pouch, with the negative terminal tab and the positive terminal tab extending from the pouch packaging material to provide connection to appropriate external contacts. Electrolyte is added to the pouch, and the pouch is sealed to complete the battery.

Figure 7:
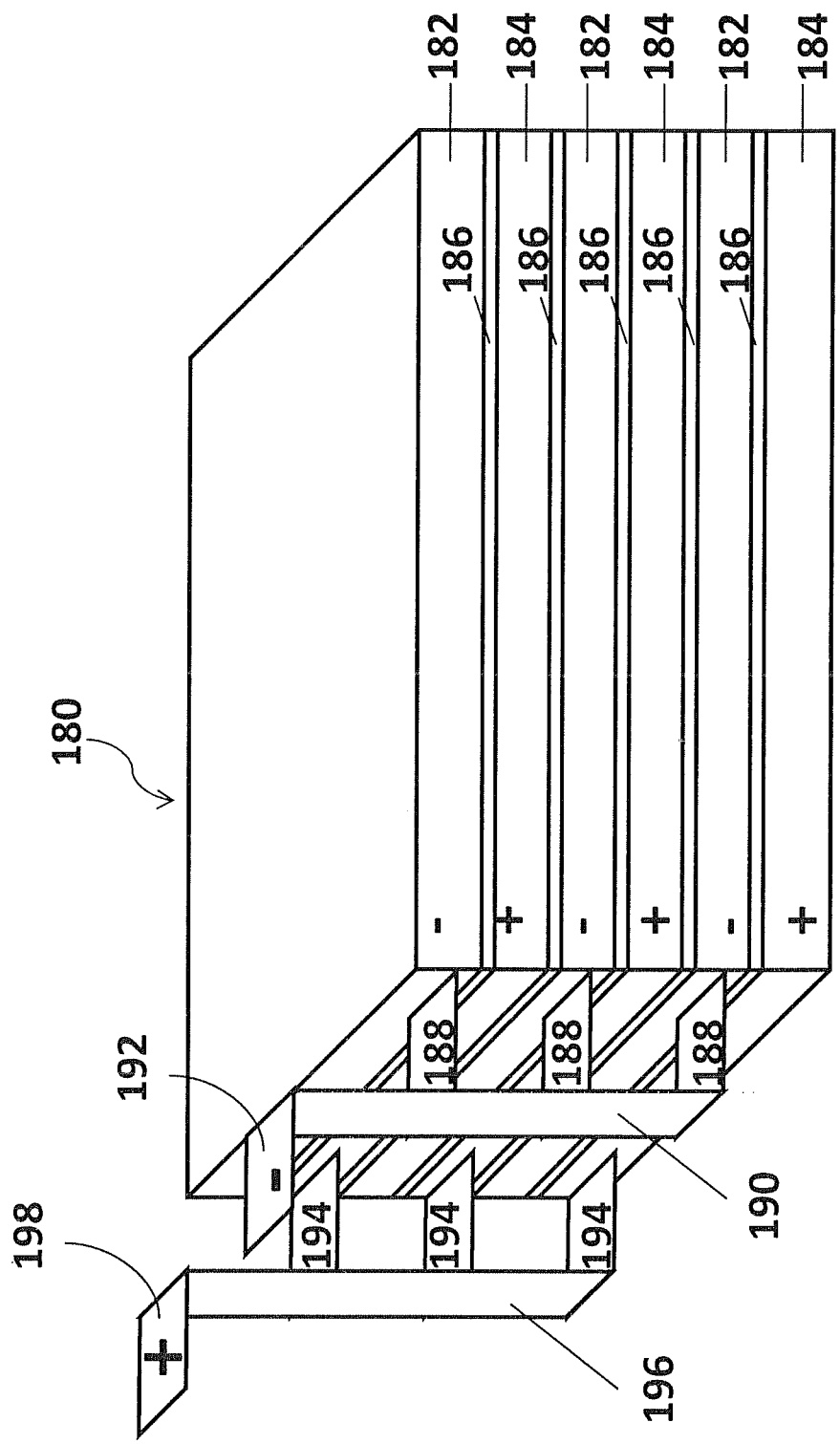
FIG. 7 is a perspective side view of a battery stack with a plurality of parallel connected electrodes of each polarity.

Referring to FIG. 7, a schematic representative battery core 180 comprises three negative electrodes 182, three positive electrodes 184, and five separators 186, with the electrodes stacked in parallel. A separator 186 is placed between each adjacent negative electrode 182 and positive electrode 184. Generally, each negative electrode 182 may be associated with a current collector having a tab 188, which is in turn connected to an electrically conductive element 190 with a conductive terminal tab 192. Similarly, each positive electrode 184 may be associated with a current collector having a tab 194, which is in turn connected to an electrically conductive element 196 with a conductive terminal tab 198. Of course, the battery core will generally have a greater number of electrodes than shown in FIG. 7.

Commercial batteries are generally designed to have an excess capacity in the negative electrode relative to the positive electrode so that the cells are not limited by the anode during discharge and so that lithium metal does not plate out on the negative electrode during recharge of the cell. Lithium metal can cause cycling problems as well as safety concerns due to the reactivity of the lithium metal. To achieve the desired high energy for the cell, the negative electrode structure can be made somewhat thicker so that the negative electrode can provide the appropriate capacity in view of high positive electrode capacities achieved with the materials and structures described herein. While the batteries may have excess negative electrode capacity, the positive electrode and negative electrode generally are relatively balanced so that the excess capacity of the negative electrode can be chosen to be only a selected fraction greater than the positive electrode capacity.

The positive electrode composition and negative electrode composition are generally assembled as a paste onto a current collector, such as a metal foil current collector. For an electrode stack with a plurality of electrodes of each polarity, it may be desirable for internal electrodes of the stack to coat a current collector on both sides with electrode material. In some embodiments, the negative electrodes can have a thickness on each side of the current collector following compression and drying of the negative electrode material from 45 microns to 200 microns, in some embodiments from about 70 microns to about 175 microns, and in further embodiments from 75 microns to 150 microns. Correspondingly, the positive electrodes can have a thickness on each side of the current collector following compression and drying of the positive electrode material from about 45 microns to about 300 microns, in some embodiments from about 80 microns to about 275 microns and in additional embodiments from about 90 microns to about 250 microns. A person of ordinary skill in the art will recognize that additional ranges of electrode thicknesses within the explicit ranges above are contemplated and are within the present disclosure.

The nature of the negative electrode intercalation material influences the resulting voltage of the battery since the voltage is the difference between the half cell potentials at the cathode and anode. Suitable negative electrode active materials include, for example, lithium intercalating carbons, some metal alloys, some silicon materials and some metal oxides. Specifically, negative electrode lithium intercalation compositions can include, for example, graphite, synthetic graphite, hard carbon, mesophase carbon, appropriate carbon blacks, coke, fullerenes, niobium pentoxide, intennetallic alloys, silicon alloys, tin alloys, silicon, titanium oxide, tin oxide, lithium titanium oxide, such as $Li_xTiO_2$, $0.5<x\leq1$ or $Li_{1+x}Ti_{2-x}O_4$, $0\leq x\leq 1/3$, and combinations thereof. Graphitic carbon has been commercially used for lithium ion secondary batteries, and graphitic carbon with intercalated lithium has a potential just slightly less electronegative relative to lithium metal.

Hard carbon suitable for use in negative electrodes is described further in U.S. patent application Ser. No. 2003/0157014A to Wang et al., entitled "Pyrolyzed Hard Carbon Material, Preparation and its Applications," incorporated herein by reference. Alloy based anodes are described further, for example, in U.S. Pat. No. 6,730,429 to Thackeray et al, entitled "Intennetallic Negative Electrodes for Non-Aqueous Lithium Cells and Batteries," published U.S. patent application Ser. No. 2007/0148544A1 to Le, entitled "Silicon-Containing Alloys Useful as Electrodes for Lithium-Ion Batteries," and U.S. Pat. No. 7,229,717 to Yamaguchi et al., entitled "Anode Active Material and Battery Using it," all three of which are incorporated herein by reference.

Similarly, other appropriate electroactive negative electrode compositions can be used that provide appropriate discharge voltages with desired cycling capability. For example, additional negative electrode materials are described in copending published U.S. patent applications 2010/0119942 to Kumar, entitled "Composite Compositions, Negative Electrodes With Composite Compositions and Corresponding Batteries," and 2009/0305131 to Kumar et al., entitled "Lithium Ion Batteries With Particular Negative Electrode Compositions," both of which are incorporated herein by reference. Silicon and silicon oxide based negative electrode materials are described in copending U.S. patent applications publication number 2011/0111294 to Lopez et al., entitled "High Capacity Anode Materials for Lithium Ion Batteries," and Ser. No. 13/108,708 to Deng et al. entitled: "Silicon Oxide Based High Capacity Anode Materials for Lithium Ion Batteries," both of which are incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof.

The positive electrode active compositions and negative electrode active compositions generally are powder compositions that are held together along with any supplemental electrically conductive powders in the corresponding electrode with a polymer binder. The binder provides ionic conductivity to the active particles when in contact with the electrolyte. Suitable polymer binders include, for example, polyvinylidine fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. The positive electrode active material loading in the binder can be large, such as greater than about 80 weight percent. High loadings of positive electrode active material powders within the positive electrode can be formed with a more desirable and reproducible degree of mechanical stability using polymers with a high molecular weight. In particular, in some embodiments, PVDF polymer binders have an average molecular weight of at least about 800,000 atomic mass units (AMU), in further embodiments at least about 850,000 AMU, in further embodiments at least about 900,000 AMU and in additional embodiments from about 1,000,000 AMU to 5,000,000 AMU. A person of ordinary skill in the art will recognize that additional ranges of composition within the explicit ranges above are contemplated and are within the present disclosure. To form the electrode, the powders can be blended with the polymer in a suitable liquid, such as a solvent for the polymer. The resulting paste can be pressed into the electrode structure.

To achieve the very high energies for the cells described herein, the positive electrode designs generally comprise the high capacity positive electrode active compositions described herein. However, the positive electrodes generally also involve a high loading of the electroactive materials into the electrode with corresponding decreases in relative amounts of electrically conductive powders and binder. The electrode should have appropriate cohesiveness at the high particle loadings. This can be accomplished with appropriate selection of the polymer binder, such as using a high molecular weight binder and/or a rubber polymer.

In some particular embodiments, the positive electrode can comprise from about 90 to about 99 weight percent active material, in further embodiments from about 92 to 98 weight percent, in additional embodiments from about 92.to about 97.5 weight percent and in other embodiments from about 92.5 to about 97 weight percent active material. Similarly, the positive electrode can comprise from about 0.1 to about 8 weight percent supplemental electrically conductive agent, in further embodiments from about 0.5 to about 6 weight percent electrically conductive agent and in additional embodiments from about 1 to about 5 weight percent electrically conductive agent. In addition, the positive electrode can comprise from about 0.5 to about 8 weight percent polymer binder, in further embodiments from about 1.0 to about 6 weight percent polymer binder and in additional embodiments from about 1.5 to about 5 weight percent polymer binder. A person of ordinary skill in the art will recognize that additional ranges of amounts of positive electrode compositions within the explicit ranges above are contemplated and are within the present disclosure.

The electrode generally is associated with an electrically conductive current collector to facilitate the flow of electrons between the electrode and an exterior circuit. The current collector can comprise metal, such as a metal foil, a metal grid or screen, or expanded metal. Expanded metal current collectors refer to metal grids with a greater thickness such that a greater amount of electrode material is placed within the metal grid. In some embodiments, the current collector can be formed from nickel, aluminum, stainless steel, copper or the like. The electrode material can be cast in contact with the current collector. For example, in some embodiments, the electrode material in contact with the current collector foil or other structure can be subjected to a pressure from about 2 to about 10 kg/cm$^2$ (kilograms per square centimeter). The pressed structure can be dried, for example in an oven, to remove the solvent from the electrode. In some embodiments, copper foils can be used as current collectors for negative electrodes, and aluminum foil can be used as positive electrode current collectors.

Pastes or slurries of the cathode materials can be coated onto one or both sides of the foil or other current collector structure. Then, the electrodes can be pressed using calendering rolls, a press with a die or other suitable processing apparatus to compress the electrodes to a desired thickness. In some embodiments, the anode can have a density of from about 1.2 to 1.8 g/mL. In some embodiments, the positive electrodes can have an active material particle loading on each side of the current collector from about 20 mg/cm$^2$ to about 50 mg/cm$^2$. The positive electrodes can have a density of at least about 2.5 grams per milliliter (g/mL), in further embodiments at least about 2.8 g/ml and in additional embodiments from about 3.0 g/mL to about 3.5 g/mL. A person of ordinary skill in the art will recognize that additional ranges of electrode densities within the explicit range above are contemplated and are within the present disclosure.

The separator is located between adjacent positive electrodes and negative electrodes. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can further reduce the fire risk. Polymer-ceramic composites for separator materials are described further in U.S. patent application Ser. No. 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

Electrolytes for lithium ion batteries can comprise one or more selected lithium salts. For lithium ion batteries, a non-aqueous liquid is generally used to dissolve the lithium salt(s). The solvent is generally inert and does not dissolve the electroactive materials. In general, appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof.

Appropriate lithium salts generally have inert anions. Lithium salts for lithium ion batteries generally include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and combinations thereof. In some embodiments, the electrolyte comprises a 1 M concentration of the lithium salts, although other concentrations can be used. In alternative embodiments, solid electrolyte can be used, which generally also functions as the separator for electrodes. Solid electrolytes are described further, for example, in U.S. Pat. No. 7,273,682 to Park et al., entitled "Solid Electrolyte, Method for Preparing the Same, and Battery Using the Same," incorporated herein by reference.

However, improved electrolytes have been developed for higher voltage operation with charging to voltages above 4.3 volts. These improved electrolytes generally comprise a primary lithium electrolyte salt, a solvent comprising ethylene carbonate and a liquid organic solvent selected from the group consisting of dimethyl carbonate, methyl ethyl carbonate, γ-butyrolactone, γ-valerolactone or a combination thereof, and a lithium salt electrolyte stabilizing additive in a concentration from about 0.01 weight percent to about 1.5 weight percent. In some embodiments, the stabilizing additive comprises lithium difluoro oxalato borate. Good cycling results for a lithium ion battery based on lithium rich positive electrode active composition have been obtained with LiPF$_6$ and/or LiBF$_4$ at concentrations from about 1.25M to about 2.5M. The improved electrolytes and stabilizing additives are described further in the '019 application cited above.

The batteries described herein are formed with active materials that provide for a high degree of safety. Commercial lithium ion batteries have suffered from safety concerns due to occasions of batteries catching fire. In contrast with commercial cells having relatively high energy capacity, the cells described herein are based on materials that generally do not have corresponding instabilities so that the present cells do not exhibit thermal run away. Thus, the cells herein provide improved energy capacity as well as providing increased safety during use.

Positive Electrode Active Materials

The improved high energy batteries described herein generally incorporate positive electrode active materials with a large energy density relative to conventional materials. These materials can be prepared with suitable material properties, for example, tap density, such that the powders can be effectively assembled into batteries that have correspondingly high energies. Thus, appropriate improved positive electrode active materials have been discovered to be useful in producing the desirable batteries with the assembly processes described herein.

When the corresponding batteries with the intercalation-based positive electrode active materials are in use, the intercalation and release of lithium ions from the lattice induces changes in the crystalline lattice of the active material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced.

Also, on the first cycle of the battery, generally there is an irreversible capacity loss that it significantly greater than per cycle capacity loss at subsequent cycles. The irreversible capacity loss is the difference between the charge capacity of the new battery and the first discharge capacity. To compensate for this first cycle irreversible capacity loss, extra active material is included in the negative electrode such that the cell can be fully charged even though this lost capacity is not accessible during most of the life of the battery so that some negative electrode material is essentially wasted. With lithium rich positive electrode active materials, the bulk of the first cycle irreversible capacity loss may be attributable to the positive electrode material, although irreversible capacity loss is generally associates with the foimation of solvent electrolyte interphase layer associated with the negative electrode active material.

The lithium ion batteries can use a positive electrode active material that is lithium rich relative to a reference homogenous electrode active lithium metal oxide composition. While not wanted to be limited by theory, it is believed that appropriately formed lithium-rich lithium metal oxides have a composite crystal structure in which, for example, a $Li_2MnO_3$ component is structurally integrated with a layered $LiMnO_2$ component or similar composite compositions with the manganese ions substituted with other transition metal ions with equivalent oxidation states. In some embodiments, the positive electrode material can be represented in two component notation as $x\,Li_2M'O_3 \cdot (1-x)LiMO_2$ where M is one or more of metal ions having an average valance of three with at least one ion being manganese, cobalt, or nickel and where M' is one or more metal ions having an average valance of four and $0<x<1$. In some embodiments, x is from about 0.05 to about 0.8 and in other embodiments from about 0.1 to about 0.5. These classes of compositions are described further in U.S. Pat. No. 6,677,082 to Thackeray et al. (the '082 Patent), entitled "Lithium Metal Oxide Electrodes for Lithium Cells and Batteries" and U.S. Pat. No. 6,680,143 to Thackeray et al. (the '143 Patent), entitled "Lithium Metal Oxide Electrodes for Lithium Cells and Batteries," both of which are incorporated herein by reference. Thackeray identified Mn, Ti and Zr as being of particular interest as M' and Mn and Ni for M.

Batteries formed from these materials have been observed to cycle at higher voltages and with higher capacities relative to batteries formed with corresponding $LiMO_2$ compositions. In some embodiments, the layered lithium rich compositions can be represented in two component notation as $x\,Li_2MnO_3 \cdot (1-x)LiMn_{2-y}M_yO_4$, where M is one or more metal cations. The positive electrode materials with the composite crystal structure can exhibit high specific capacity that is above 200 milliamp hours per gram (mAh/g) at room temperature with good cycling properties.

Lithium rich high energy positive electrode active materials of particular interest herein can be described by the formula $Li_{1+b}Ni_\alpha Mn_\beta Co_\gamma A_\delta O_{2-31\ z/2}F_z$, where b ranges from about 0.01 to about 0.3, α ranges from about 0 to about 0.4, β range from about 0.2 to about 0.65, γ ranges from about 0 to about 0.46, δ ranges from about 0 to about 0.15 and z ranges from about 0 to about 0.2 with the proviso that α and γ are not both zero, and where A is Mg, Sr, Ba, Cd, Zn, Al, Ga, B, Zr, Ti, Ca, Ce, Y, Nb, Cr, Fe, V, Li or combinations thereof. In further embodiments, b ranges from about 0.025 to about 0.25, α ranges from about 0.1 to about 0.4, β ranges from about 0.25 to about 0.65, and γ ranges from about 0 to about 0.4. In some embodiments, b ranges from about 0.015 to about 0.19. In additional embodiments, α ranges from about 0.1 to about 0.3, β range from about 0.3 to about 0.65, γ ranges from about 0.05 to about 0.4. δ can be zero to yield a composition based on the metals Li, Ni, Mn and Co. A person of ordinary skill in the art will recognize that additional ranges of parameter values within the explicit ranges above are contemplated and are within the present disclosure. The fluorine is an optional dopant that can contribute to cycling stability as well as improved safety of the materials. It has also been found that metal and fluorine dopants can also influence the capacity and impedance of the layered lithium metal oxide structures. Particular desired compositions with fluorine dopants are described further in published U.S. patent application 2010/0086854 to Kumar et al, entitled "Fluorine Doped Lithium Rich Metal Oxide Positive Electrode Battery Materials With High Specific Capacity and Corresponding Batteries," incorporated herein by reference.

In embodiments in which z=0, this formula reduces to $Li_{1+x}Ni_\alpha Mn_\beta Co_\gamma A_\delta O_2$. Compositions represented with the formula $Li_{1+x}Ni_\alpha Mn_\beta Co_\gamma A_\delta O_2$ can be alternatively written in the two component notation referenced above. It has been found that suitable coatings provide desirable improvements in cycling properties without the use of a fluorine dopant, although it may be desirable to have a fluorine dopant in some embodiments. As noted below, some coatings also surprisingly improve the performance of the active materials separately from the cycling stability. Furthermore, in some embodiments it is desirable to have δ=0 such that the compositions are simpler while still providing desired performance. For these embodiments, if z=0 also, the formula simplifies to $Li_{1+x}Ni_\alpha Mn_\beta Co_\gamma O_2$, with the parameters outlined above. However, desired performance has been observed in particular for compositions in which A is a +2 ion, as described in copending U.S. patent application Ser. No. 12/753,312 to Karthikeyan et al., entitled "Doped Positive Electrode Active Materials and Lithium Ion Secondary Battery Constructed Therefrom," incorporated herein by reference.

The crystalline structure of some specific lithium rich layered structures is described further in Thackeray et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. For example, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al. (the '930 application), entitled "Cathode Active Material Coated with Fluorine Compound for Lithium Secondary Batteries and Method for Preparing the Same," incorporated herein by reference. This patent application provides results for $LiCoO_2$ coated with LiF, $ZnF_2$ or $AlF_3$. In general, a selected metal fluoride or metalloid fluoride can be used for the coating. Similarly, a coating with a combination of metal and/or metalloid elements can be used. Suitable metals and metalloid elements for the fluoride coatings include, for example, Al, Bi, Ga, Ge, In, Mg, Pb, Si, Sn, Ti, Tl, Zn, Zr and combinations thereof Aluminum fluoride can be a desirable coating material since it has a reasonable cost and is considered environmentally benign.

It has been discovered that the particular composition can be engineered to achieve desired battery performance parameters. In particular, the amount of excess lithium can be selected, which corresponds with a selection of the value of x in the formula . . . Similarly, the relative amounts of the transition metals can be selected. These engineered compositions are described further in published U.S. patent application 2011/0052981 to Lopez et al. ("the '981 application"), entitled "Layer-Layer Lithium Rich Complex Metal Oxides With High Specific Capacity and Excellent Cycling," incorporated herein by reference.

It has been discovered that metal fluoride coatings can provide significant improvements for lithium rich layered positive electrode active materials described herein. In particular, the cycling properties of the batteries formed from the metal fluoride coated lithium metal oxide have been found to significantly improve from the uncoated material. Additionally, the overall capacity of the batteries also shows desirable properties with the fluoride coating, and the irreversible capacity loss of the first cycle of the battery is reduced. It has been found that metal/metalloid fluoride coatings can significantly improve the performance of lithium rich layered compositions for lithium ion secondary batteries as demonstrated in the examples in published U.S. patent applications 2010/0086853 to Venkatachalam et al. (the '853 Application) entitled "Positive Electrode Material for Lithium Ion Batteries Having a High Specific Discharge Capacity and Processes for the Synthesis of these Materials", 2010/0151332 to Lopez et al. (the '332 application) entitled "Positive Electrode Material for High Specific Discharge Capacity Lithium Ion Batteries", and both of which are incorporated herein by reference, as well as the '981 application cited above. While the coating improves the capacity of the batteries, the coating itself is not believed to be electrochemically active.

It has been surprisingly found that intermediate thicknesses of the coating can lead to surprising improvements in the performance of the positive electrode active materials. Improvements in fluoride coatings as well as oxide coatings and phosphate coatings based on appropriate coating designs are described in copending U.S. patent application publication number 2011/0111298 to Lopez et al., entitled "Coated Positive Electrode Materials for Lithium Ion Batteries," incorporated herein by reference. Improvements in metal halide coatings based on appropriate coating designs are described in copending U.S. patent application Ser. No. 12/888,131 to Venkatachalam et al., entitled "Metal Halide Coatings on Lithium Ion Battery Positive Electrode Materials and Corresponding Batteries," incorporated herein by reference. In general, the coatings can have an average thickness of no more than about 40 nm, in further embodiments no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure.

An increase in specific discharge capacity and improved cycling were obtained with metal oxide coatings, e.g., $Al_2O_3$ coatings, as described in published U.S. patent application number 2011/0076556 to Karthikeyan et al., entitled "Metal Oxide Coated Positive Electrode Materials for Lithium Ion Batteries," incorporated herein by reference. Desirable metal oxide coatings include, for example, $Al_2O_3$, MgO and $Bi_2O_3$ coatings. With respect to metal oxide coatings, see also Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference The use of a $LiNiPO_4$ coating to obtain improved cycling performance is described in an article to Kang et al. "Enhancing the rate capability of high capacity $xLi_2MnO_3(1-x)LiMO_2$ (M=Mn, Ni, Co) electrodes by Li—Ni—$PO_4$ treatment," Electrochemistry Communications 11, 748-751 (2009), incorporated herein by reference.

The positive electrode material can be advantageously synthesized by co-precipitation and sol-gel processes detailed in the '853 application and the '332 application. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. In particular, surprisingly good results have been obtained for $Li[Li_{0.2}Ni_{0.175}Co_{0.10}Mn_{0.525}]O_2$. A carbonate co-precipitation process described in the '332 application gave desired lithium rich metal oxide materials having cobalt in the composition and exhibiting the high specific capacity performance with superior tap density. These copending patent applications also describe the effective use of metal fluoride coatings to improve performance and cycling.

The lithium element can be incorporated into the material at one or more selected steps in the synthesis process. For example, a lithium salt can be incorporated into the solution prior to or upon performing the precipitation step through the addition of a hydrated lithium salt. In this approach, the lithium species is incorporated into the carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal hydroxide or carbonate. The powder mixture is then advanced through the heating step(s) to form the oxide and then the crystalline positive electrode material.

The fluoride coating of the positive electrode material can be deposited using a solution based precipitation approach. A powder of the positive electrode material can be mixed in a suitable solvent, such as an aqueous solvent. A soluble composition of the desired metal/metalloid cations can be dissolved in the solvent. Then, $NH_4F$ can be gradually added to the dispersion/solution to precipitate the corresponding metal/metalloid fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere. The formation of inert metal oxide coatings, such as metal oxide coatings and Li—Ni—$PO_4$ coatings are described in the references cited above.

The performance of the positive electrode active materials is influenced by many factors. The mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode. The coatings can be added while still obtaining good tap densities using the processes to form the positive electrode active materials described herein. In general, tap densities of the positive electrode active materials can be obtained of at least about 1.3 grams/milliliter (g/mL), in further embodiments at least about 1.6 g/mL and in some embodiments at least about 2.0 g/mL, where the tap density can be obtained using commercial tapping apparatuses using reasonable tapping parameters. A person of ordinary skill in the art will recognize that additional ranges of tap density within the specific ranges above are contemplated and are within the present disclosure.

The positive electrode active compositions can exhibit high specific capacities in lithium ion cells under realistic discharge conditions. In general, when specific capacities are comparable, a higher tap density of a positive electrode material results in a higher overall capacity of a battery. It is noted that during charge/discharge measurements, the specific capacity of a material depends on the rate of discharge, with lose of capacity as the discharge rate increases. The maximum capacity of a specific cell is measured at very slow discharge rates. In actual use, the actual capacity is less than the maximum capacity due to discharge at a finite rate. The lithium rich positive electrode active materials can also exhibit good rate capabilities. The notation C/x implies that the battery is discharged at a rate to fully discharge the battery to the selected lower voltage cut off in x hours.

More realistic capacities can be measured using reasonable rates of discharge that are more similar to the rates during use. For low to moderate rate applications, a reasonable testing rate involves a discharge of the cell over three hours, i.e. a rate of C/3 or 0.33C. In general, the positive electrode active materials can have a high energy capacity, generally at least about 200 milliampere hours/gram (mAh/g), in some embodiments at least about 225 mAh/g, and in further embodiments at least about 250 mAh/g, with good cycling. In some embodiments, the positive electrode active materials used herein can have a specific discharge capacity of at least about 235 mAh/g at a discharge rate of C/10 at room temperature when discharged from 4.6 volts and tap density above 1.8 g/mL. The greatest capacity performance in the lithium ion batteries has been obtained with coated positive electrode active materials.

Improved Cell Performance

With the cells designs described herein, the batteries can have a total energy density of at least about 160 Watt-hours/kilogram (Wh/kg), in other embodiments at least about 200 Wh/kg, in further embodiments from about 240 to 400 Wh/kg, in some embodiments from about 260 to 380 Wh/kg and in further embodiments from about 280 to 350 Wh/kg, in a desired shape and sized battery. Alternatively, when measured in volumetric terms, the batteries can have a total volumetric energy density of at least about 300 Watt-hours/liter (Wh/l), in further embodiments from about 400 to 1150 Wh/l, in some embodiments from about 550 to 1050 Wh/l and in further embodiments from about 650 to 1000 Wh/l, in a desired shape and sized battery. The volume of a battery can be evaluated as described above with respect to the pouch battery body excluding edge structure and terminal tabs. A person of ordinary skill in the art will recognize that additional ranges of battery capacities within the explicit ranges above are contemplated and are within the present disclosure.

In general, various similar testing procedures can be used to evaluate the battery performance. Specifically, for a battery using graphitic carbon as a negative electrode active material, the battery can be cycled between 4.5 volts and 2.0 volts at room temperature, although other ranges can be used with correspondingly different results. The evaluation over the range from 4.5 volts to 2.0 volts is suitable for determining battery performance at a high depth of discharge. The first cycle involves irreversible changes to the battery materials. With the lithium rich positive electrode materials described herein, the positive electrodes are believed to undergo significant changes during the first charge and discharge cycle, which can be referred to as the formation cycle. Also, a coating referred to as a solvent electrolyte interphase (SEI) layer forms over the negative electrode active material. A stable SEI layer is believed to stabilize battery cycling.

For the lithium rich positive electrode active material described herein an improved formation protocol has been developed with an initial lower voltage charge up to no more than about 4.3V. After an open circuit rest period of at least about 12 hours at this initial voltage, the battery is then charged to its full voltage greater than about 4.35V prior to discharging the battery. This improved formation protocol is described further in copending published U.S. patent application 2011/0136019 to Amiruddin et al., entitled "High Voltage Battery Fonnation Protocols and Control of Charging and Discharging for Desirable Long Term Cycling Performance," incorporated herein by reference.

With respect to cycling performance, in some embodiments, the positive electrode active material has a specific capacity during the tenth cycle at a discharge rate of C/3 of at least about 230 milliamp hours per gram (mAh/g), in some embodiments at least about 235 mAh/g, in additional embodiments from about 240 mAh/g to about 310 mAh/g, in further embodiments from about 245 mAh/g to about 300 mAh/g and in other embodiment from about 250 mAh/g to about 290 mAh/g. Additionally, the 20$^{th}$ cycle discharge capacity of the material can be at least about 98%, and in further embodiments 98.5% of the 5$^{th}$ cycle discharge capacity, cycled at a discharge rate of C/3. The tap density of the material can be at least about 1.8 g/mL, in further embodiments from about 2 to about 3.5 g/mL and in additional embodiments from about 2.05 to about 2.75 g/mL. High tap density translates into high overall capacity of a battery given a fixed volume. A person of ordinary skill in the art will recognize that additional ranges of specific capacity and tap density and of decreases in irreversible capacity loss are contemplated and are within the present disclosure. For fixed volume applications such as batteries for electronic devices, high tap density therefore high overall capacity of the battery is of particular significance.

Generally, tap density is the apparent powder density obtained under stated conditions of tapping. The apparent density of a powder depends on how closely individual particles of the powder are pack together. The apparent density is affected not only by the true density of the solids, but by the particle size distribution, particle shape and cohesiveness. Handling or vibration of powdered material can overcome some of the cohesive forces and allow particles to move relative to one another so smaller particles can work their way into the spaces between the larger particles. Consequently, the total volume occupied by the powder decreases and its density increases. Ultimately no further natural particle packing can be measured without the addition of pressure and an upper limit of particle packing has been achieved. While electrodes are formed with the addition of pressure, a reasonably amount of pressure is only effective to form a certain packing density of the electroactive materials in the battery electrode. The actual density in the electrode generally relates to the tap density measured for a powder so that the tap density measurements are predictive of the packing density in a battery electrode with a higher tap density corresponding to a higher packing density in the battery electrode.

The U.S. Department of Energy has defined specific tests for batteries intended for use in plug-in hybrid vehicles. These are described in the "Battery Test Manual for Plug-In Hybrid Vehicles" Revision 0, March 2008, incorporated herein by reference. The Hybrid Pulse Power Characterization (HPPC) test is intended for evaluation of the dynamic power capabilities of a battery over the useable voltage range. A variation of this test was performed with a 60 Amp discharge a 40 second rest period and a 45 Amp recharge with a 10 second discharge pulse and a 10 second recharge pulse. This pulsed discharge is performed for a range of state of charge after an hour equilibration period, and the power density is measured at the end of the pulse. At a state of charge of at least 50%, the batteries described herein can generate at least about 1000 W/kg, in other embodiments at least about 2000 W/kg, in further embodiments at least about 2250 W/kg and in additional embodiments from about 2400 W/kg to about 2700 W/kg. A person of ordinary skill in the art will recognize that additional ranges of power density within the explicit ranges above are contemplated and are within the present disclosure.

It is also useful to evaluate the DC resistance profiles as a function of state of charge. The DC resistance from a 10 second pulse is defined as the change in voltage from the beginning of the pulse to the end of the pulse divided by the change in current at the beginning of the pulse and at the end of the pulse. The batteries described herein can exhibit a DC resistance at a 1 hour rate (1C) in a 10 second pulse test for both charging and discharging with a state of charge of 50% or greater that is no more than about 7 milliohms, in other embodiments no more than about 6 milliohms and in further embodiments no more than about 5 milliohms. In some embodiments, the batteries exhibit a DC discharge resistance of no more than about 10 milliohms at a state of charge of at least about 22%, in further embodiments at least about 25% and in other embodiments at least about 30%. A person of ordinary skill in the art will recognize that additional ranges of DC resistance performance within the explicit ranges above are contemplated and are within the present disclosure.

EXAMPLE

15 Ah Lithium-Ion Polymer Pouch Battery

A pouch battery was constructed with reasonable dimensions that achieved 15 Ah and good performance parameter using a lithium rich lithium metal oxide.

The lithium metal oxide (LMO) powders had a composition approximately represented by the formula $Li_{1+x}Ni_{w}Co_{y}Mn_{z}O_{2}$, where $1.1 \leq x \leq 1.15$, $0.2 \leq w \leq 0.25$, $0.125 \leq y \leq 0.175$, and $0.45 \leq z \leq 0.5$. The LMO powder was mixed thoroughly with acetylene black (Super P™ from Timcal, Ltd, Switzerland) and graphite (KS 6™ from Timcal, Ltd) to form a homogeneous powder mixture. Separately, Polyvinylidene fluoride (PVDF) (KF1300™ from Kureha Corp., Japan) was mixed with N-methyl-pyrrolidone (NMP) (Honeywell—Riedel-de-Haen) and stirred overnight to form a PVDF-NMP solution. The homogeneous powder mixture was then added to the PVDF-NMP solution and mixed to form homogeneous slurry. The slurry was applied onto an aluminum foil current collector to faun a thin wet film using a blade coating process.

A positive electrode structure was formed by drying the aluminum foil current collector with the thin wet film in vacuum oven to remove NMP. The positive electrode and the foil current collector were pressed together between rollers of a sheet mill to obtain a positive electrode structure with desired thickness. The completed cathodes (positive electrodes) had an active material loading of about 11.85 mg/cm$^2$. The average thickness with the foil for the cathodes was about 110 microns.

A blend of graphite and binder was used as the anode (negative electrode), and the negative electrode composition was coated onto a copper foil current collector. The polymer binder was a blend of styrene-butadiene rubber (SBR) and carboxymethyl cellulose. The loading of active material in the anode was 8.10 mg/cm$^2$. The foil and anode paste were pressed together between rollers of a sheet mill. The completed anodes had a total thickness with the foil of about 115 microns.

The battery was constructed with 24 anode plates alternating with 23 cathode plates such that an anode plate is positioned at both ends of the stack. A trilayer (polypropylene/polyethylene/polypropylene) micro-porous separator (2320 from Celgard, LLC, NC, USA) soaked with electrolyte was placed between adjacent anodes and cathodes. The electrolyte was selected to be stable at high voltages, and appropriate electrolytes are described in copending U.S. patent application Ser. No. 12/630,992 to Amiruddin et al., entitled "Lithium Ion Battery With High Voltage Electrolytes and Additives," incorporated herein by reference. The electrode stack was then assembled into a conventional pouch cell structure similar to the battery shown in FIGS. 4 and 5. The resulting pouch battery had dimensions of 203 mm×93 mm×7.1 mm. The battery had a room temperature discharge capacity of 15.3 Ah at a discharge rate of C/3, discharged from 4.5V to 2V.

Figure 8:
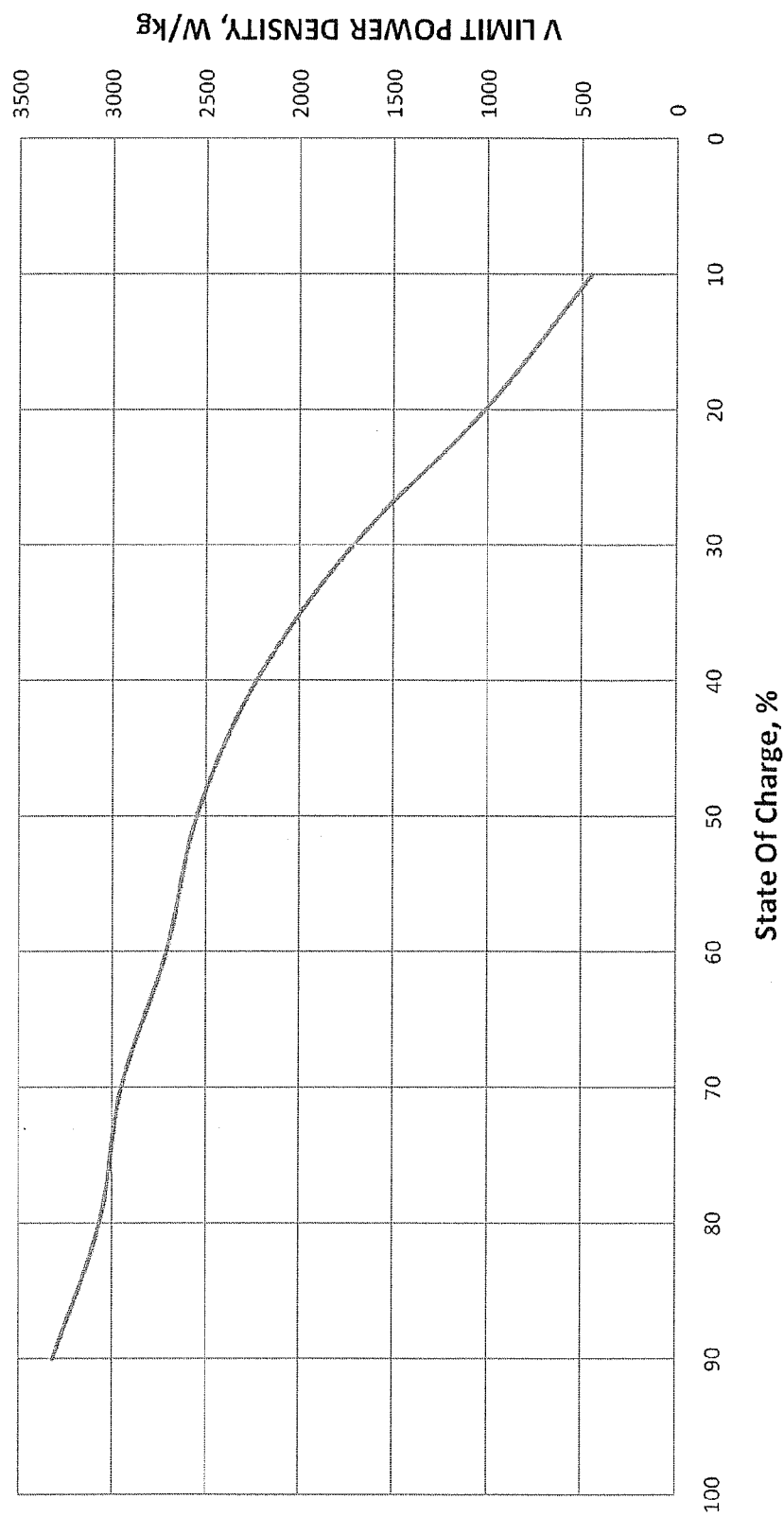
FIG. 8 is a plot of voltage limited specific power density as a plot of initial state of charge for a 15 Ah, 4.5V (fully charged) pouch battery that is obtained with a room temperature 45 Amp charge, a 60 Amp discharge with a 10 second discharge pulse.

The voltage limited power density of the battery was calculated from the current capability measurements. For example, with a 10 second pulse at 60 Amps, the voltage limited power density was calculated as VLPD in W/kg. For 10 second pulses, the VLPD was evaluated for a range of initial state of charge. The results are plotted in FIG. 8. At states of charge greater than about 75%, the VLPD was greater than 3000 W/kg.

Figure 9:
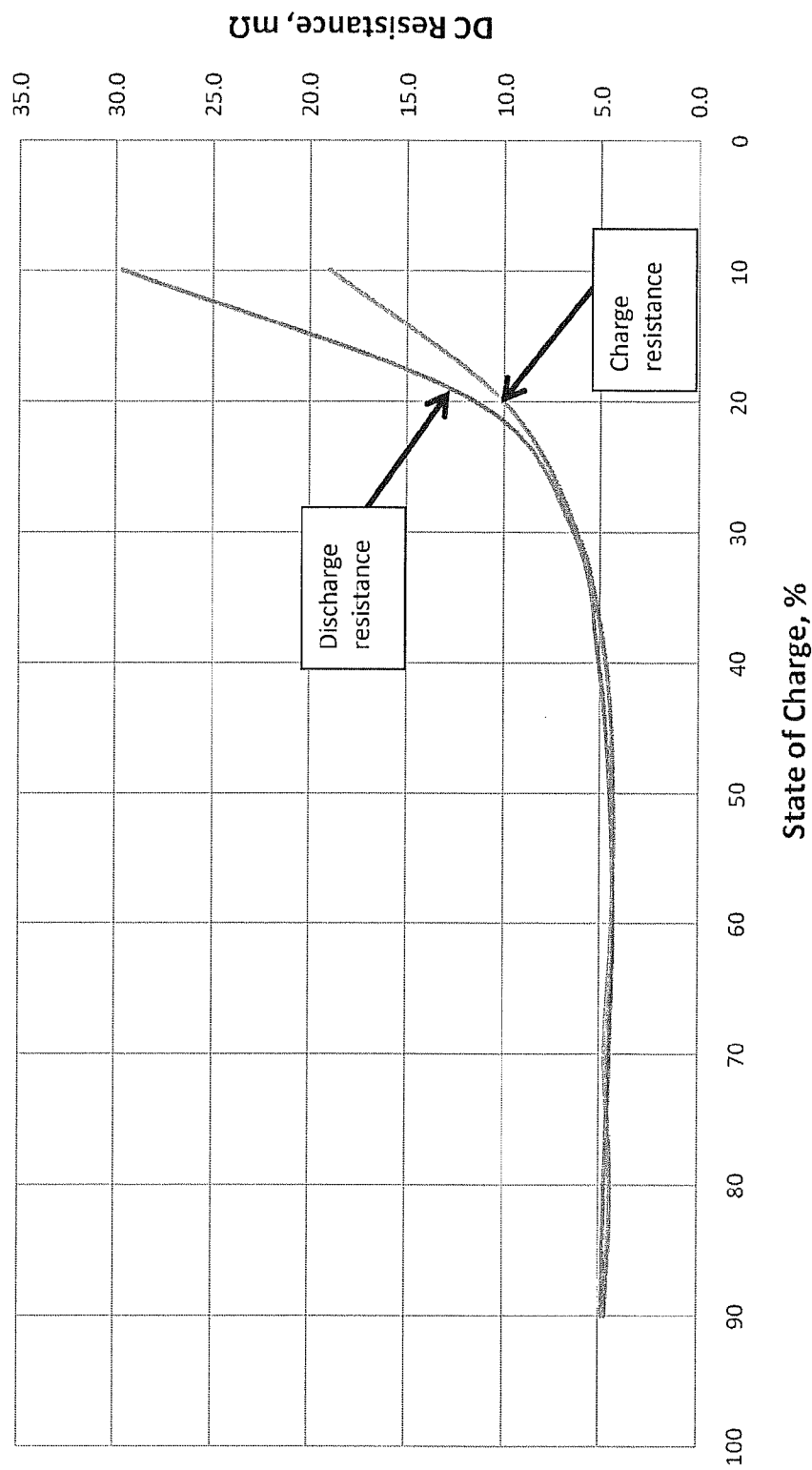
FIG. 9 is a plot of DC electrical resistance for a 15 Ah, 4.5V (fully charged) pouch battery as a function of the state of charge for both charging and discharging using 10 second, 1C pulses.

To perform further pulse testing, the battery is charged to 4.5V and then subjected to 1C Pulse Test at room temperature (23° C.) with 10 second pulses. In the pulse test, the DC resistance was evaluated as a function of the state of charge starting from an initial 90% state of charge. The plots of DC discharge/charge resistance versus state of charge of the battery are shown in FIG. 9. The resistance was less than about 5 milliOhms (mΩ) for a state of charge greater than about 40% and less than about 10 mΩ for a state of charge greater than about 22%. Therefore, the batteries exhibit very low DC resistance down to low states of charge. Low DC resistances can reduce heat generation in a battery pack, which can be desirable especially for vehicle applications.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A battery pack comprising a control system and no more than about 130 lithium ion pouch batteries connected in series generating an average voltage of at least about 400V with a 50% depth of discharge and having an energy capacity at full discharge of at least about 15 kilowatt-hours based on full depth of discharge, wherein each lithium ion battery has a thickness from about 7 mm to about 18 mm and a planar area from about 25,000 mm² to about 50,000 mm², wherein the positive electrode comprises an active composition approximately represented with a formula $Li_{1+b}Ni_\alpha Mn_{\beta-\delta}Co_\gamma A_\delta O_{2-z}F_z$, in which b ranges from about 0.01 to about 0.3, α ranges from 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof and wherein the control system is designed to monitor function of the series connected batteries for the operation of a vehicle without any parallel connections of the batteries.

2. The battery pack of claim 1 comprising no more than about 120 lithium ion batteries.

3. The battery pack of claim 1 wherein b ranges from about 0.025 to about 0.25, α ranges from about 0.1 to about 0.4, β ranges from about 0.25 to about 0.65, and γ ranges from about 0 to about 0.4.

4. The battery pack of claim 1 having an energy capacity at full discharge of at least about 16 kilowatt-hours based on full depth of discharge.

5. The battery pack of claim 1 wherein the positive electrode comprises an active composition approximately represented by the formula $xLi_2M'O_3 \cdot (1-x) LiMO_2$ with x from about 0.1 to about 0.5.

6. The battery pack of claim 1 having at least 111 batteries.

7. The battery pack of claim 1 wherein the batteries exhibit a room temperature voltage limited power density of at least about 1000 W/kg at a 50% state of discharge with 10 second pulses of 60 Amps discharge and a 45 Amp charge with a 40 second rest between discharge and charge at a 1 C rate and the batteries have a DC electrical resistance of no more than about 7 milliohms at a 50% state of charge based on a 10 second pulse at a rate of 1 C at room temperature.

8. A battery pack comprising no more than about 260 lithium ion pouch batteries arranged with pairs of batteries connected in parallel to form two strings of batteries connected in series generating an average voltage of at least about 400V with a 50% depth of discharge and having an energy capacity at full discharge of at least about 40 kilowatt-hours based on full depth of discharge, wherein each lithium ion battery has a thickness from about 7 mm to about 18 mm and a planar area from about 25,000 mm² to about 50,000 mm², wherein the positive electrode comprises an active composition approximately represented with a formula $Li_{1+b}Ni_\alpha Mn_{\beta-\gamma}Co_\gamma A_\delta O_{2-z}F_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof.

9. The battery pack of claim 8 wherein b ranges from about 0.025 to about 0.25, α ranges from about 0.1 to about 0.4, β ranges from about 0.25 to about 0.65, and γ ranges from about 0 to about 0.4.

10. The battery pack of claim 8 comprising no more than about 240 lithium ion batteries.

11. The battery pack of claim 8 wherein each string of batteries provides at least about 400V at 50% depth of discharge after 250 charge-discharge cycles to 50% depth of discharge.

12. The battery pack of claim 8 having an energy capacity of at least about 40 kilowatt-hours after 250 charge-discharge cycles to 50% depth of discharge.

13. The battery pack of claim 8 wherein the positive electrode comprises an active composition approximately represented by the formula $xLi_2M'O_3 \cdot (1-x) LiMO_2$ with x from about 0.05 to about 0.8.

14. The battery pack of claim 8 wherein the positive electrode comprises an active composition approximately represented by the formula $xLi_2M'O_3 \cdot (1-x) LiMO_2$ with x from about 0.1 to about 0.5.

15. The battery pack of claim 8 wherein δ ranges from about 0.01 to about 0.15, and z is 0 and wherein A is Mg, Ca, Sr, Ba, Zn, Cd, or combinations thereof.

16. The battery pack of claim 8 wherein z=0; and
α ranges from about 0.150 to about 0.2,
β ranges from about 0.52 to about 0.57,
γ ranges from about 0.075 to about 0.125, and
δ ranges from about 0.01 to about 0.05.

17. The battery pack of claim 8 wherein the positive electrode active composition is a particulate having a stabilizing inorganic coating.

18. The battery pack of claim 17 wherein the coating has an average thickness from about 0.5 nanometers (nm) to about 40 nm.

19. The battery pack of claim 8 wherein each battery comprises an electrolyte comprising $LiPF_6$ and/or $LiBF_4$, a solvent comprising ethylene carbonate and a liquid organic solvent, and an electrolyte stabilizing additive.

20. The battery pack of claim 8 wherein each battery comprises thirty to thirty-eight positive electrode plates, a corresponding number of negative electrode plates stacked to alternate with the cathode plates, a separator between adjacent cathode plates and anode plates and wherein the battery has an energy density of at least 300 Wh/L and a total capacity of at least 40 Ah.

21. The battery pack of claim 8 having at least 222 batteries.

22. The battery pack of claim 8 wherein the batteries exhibit a room temperature voltage limited power density of at least about 1000 W/kg at a 50% state of discharge with 10 second pulses of 60 Amps discharge and a 45 Amp charge with a 40 second rest between discharge and charge at a 1 C rate and the batteries have a DC electrical resistance of no more than about 7 milliohms at a 50% state of charge based on a 10 second pulse at a rate of 1 C at room temperature.

23. A lithium ion pouch battery comprising thirty-one to thirty-seven positive electrode plates, a corresponding number of negative electrode plates stacked to alternate with the cathode plates, a separator between adjacent cathode plates and anode plates, wherein the battery has a thickness from about 7 mm to about 18 mm and a planar area from about 25,000 mm$^2$ to about 50,000 mm$^2$, wherein the positive electrode comprises an active composition comprising an active composition approximately represented with a formula $Li_{1+b}Ni_\alpha Mn_{\beta-\delta}Co_\gamma A_\delta O_{2-z}F_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof, and wherein the battery has an energy density of at least 300 Wh/L and a total capacity of at least 45 Ah based on full depth of discharge.

24. The lithium ion pouch battery of claim 23 having a volume from about 300,000 mm$^3$ to about 450,000 mm$^3$.

25. The lithium ion pouch battery of claim 23 having a weight from about 0.75 kg to about 1.05 kg.

26. The lithium ion pouch battery of claim 23 wherein the negative electrode comprises graphitic carbon.

27. The lithium ion pouch battery of claim 23 wherein the negative electrode has a thickness from about 45 microns to about 200 microns on a single side of a current collector.

28. The lithium ion pouch battery of claim 23 wherein the positive electrode comprises an active composition approximately represented by a formula $xLi_2M'O_3 \cdot (1-x)LiMO_2$ with x from about 0.05 to about 0.8.

29. The lithium ion pouch battery of claim 23 wherein the positive electrode active composition is a particulate having a stabilizing inorganic coating.

30. The lithium ion pouch battery of claim 23 wherein the battery exhibits a room temperature voltage limited power density of at least about 1000 W/kg at a 50% state of discharge with 10 second pulses of 60 Amps discharge and a 45 Amp charge with a 40 second rest between discharge and charge at a 1 C rate.

31. The lithium ion pouch battery of claim 23 wherein the battery has a DC electrical resistance of no more than about 7 milliohms at a 50% state of charge based on a 10 second pulse at a rate of 1 C at room temperature.

32. A battery pack comprising a control system and no more than about 110 lithium ion pouch batteries connected in series generating an average voltage of at least about 315V with a 60% depth of discharge and having an energy capacity at full discharge of at least about 15 kilowatt-hours based on full depth of discharge, wherein each lithium ion battery has a thickness from about 7 mm to about 18 mm and a planar area from about 25,000 mm$^2$ to about 50,000 mm$^2$, wherein the positive electrode comprises an active composition approximately represented with a formula $Li_{1+b}Ni_\alpha Mn_{\beta-\delta}Co_\gamma A_{67} O_{2-z}F_z$, in which b ranges from about 0.01 to about 0.3, α ranges from about 0 to about 0.4, β ranges from about 0.2 to about 0.65, γ ranges from about 0 to about 0.46, δ ranges from 0 to about 0.15, and z ranges from 0 to about 0.2 with the proviso that α and γ are not both zero, wherein A is a metal dopant distinct from Ni, Mn and Co, or combinations thereof and wherein the control system is designed to monitor function of the series connected batteries for the operation of a vehicle without any parallel connections of the batteries.

33. The battery pack of claim 32 having at least 92 batteries.

34. The battery pack of claim 32 wherein the batteries exhibit a room temperature voltage limited power density of at least about 1000 W/kg at a 50% state of discharge with 10 second pulses of 60 Amps discharge and a 45 Amp charge with a 40 second rest between discharge and charge at a 1 C rate and the batteries have a DC electrical resistance of no more than about 7 milliohms at a 50% state of charge based on a 10 second pulse at a rate of 1 C at room temperature.

\* \* \* \* \*